US012468770B2

(12) United States Patent
Crabtree et al.

(10) Patent No.: US 12,468,770 B2
(45) Date of Patent: Nov. 11, 2025

(54) DYNAMIC EXPERIENCE CURATION PLATFORM

(71) Applicant: QOMPLX LLC, Reston, VA (US)

(72) Inventors: Jason Crabtree, Vienna, VA (US); Richard Kelley, Woodbridge, VA (US); Jason Hopper, Halifax (CA); David Park, Fairfax, VA (US)

(73) Assignee: QOMPLX LLC, Reston, VA (US)

( * ) Notice: Subject to any disclaimer, the term of this patent is extended or adjusted under 35 U.S.C. 154(b) by 0 days.

(21) Appl. No.: 18/636,264

(22) Filed: Apr. 16, 2024

(65) Prior Publication Data

US 2025/0265298 A1    Aug. 21, 2025

Related U.S. Application Data

(60) Provisional application No. 63/553,966, filed on Feb. 15, 2024.

(51) Int. Cl.
*G06F 17/30* (2006.01)
*G06F 16/9535* (2019.01)
*G09B 21/00* (2006.01)

(52) U.S. Cl.
CPC ......... *G06F 16/9535* (2019.01); *G09B 21/00* (2013.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| | | | | |
|---|---|---|---|---|
| 11,960,514 | B1 * | 4/2024 | Taylert | G06F 16/3329 |
| 12,088,599 | B1 * | 9/2024 | McCarson | G06F 18/217 |
| 12,105,729 | B1 * | 10/2024 | Haq | G06F 40/40 |
| 12,106,318 | B1 * | 10/2024 | Chiang | G06Q 30/0204 |
| 2022/0286744 | A1 * | 9/2022 | Venugopal | H04N 21/4542 |
| 2023/0048609 | A1 * | 2/2023 | Cella | G05D 1/0022 |
| 2023/0140057 | A1 * | 5/2023 | Samarthyam | G06Q 50/01 |
| | | | | 705/6 |

(Continued)

*Primary Examiner* — Hung D Le
(74) *Attorney, Agent, or Firm* — Galvin Patent Law LLC; Brian R Galvin

(57) ABSTRACT

A dynamic experience curation platform utilizing AI and ML techniques, including neural networks and generative models, to enhance user interactions with content on the Internet. The platform employs an Experience Broker (EB) service to disintermediate user devices from the internet (or other content/information sources), improving security and user experience. It processes content requests, extracts relevant information, filters out unwanted content like ads, transforms, combines, and/or mutates existing content, and generates curated content consistent with user preferences and other constraints. The platform's generative AI process renders content into a user interface consistent with user preferences. It allows for personalized content delivery across devices, including virtual and augmented reality environments. The platform supports a spectrum of personalization, allowing users to fine-tune their content consumption experience. Additionally, it manages user sessions across devices and integrates various databases for storing user profiles, preferences, and other relevant information.

33 Claims, 12 Drawing Sheets

(56) References Cited

U.S. PATENT DOCUMENTS

| | | | |
|---|---|---|---|
| 2023/0343050 A1* | 10/2023 | Kim | G06V 10/46 |
| 2023/0409615 A1* | 12/2023 | Khemka | G06V 20/68 |
| 2024/0020538 A1* | 1/2024 | Socher | G06F 16/90332 |
| 2024/0130621 A1* | 4/2024 | Islam | A61B 5/0088 |
| 2024/0241920 A1* | 7/2024 | Hwang | G06F 16/958 |
| 2024/0265047 A1* | 8/2024 | McCarson | G06V 10/70 |
| 2024/0281472 A1* | 8/2024 | LaRhette | G06F 16/248 |
| 2024/0289396 A1* | 8/2024 | Chrysanthou | G06F 40/186 |
| 2025/0088201 A1* | 3/2025 | Przybylski | G06F 8/61 |
| 2025/0130778 A1* | 4/2025 | Adler | G06F 8/71 |
| 2025/0156122 A1* | 5/2025 | Yu | G06F 9/5077 |

\* cited by examiner

DYNAMIC EXPERIENCE CURATION PLATFORM

CROSS-REFERENCE TO RELATED APPLICATIONS

Priority is claimed in the application data sheet to the following patents or patent applications, each of which is expressly incorporated herein by reference in its entirety: 63/553,966

BACKGROUND OF THE INVENTION

Field of the Art

The present invention is in the field of online user experience management, and more particularly to providing curated user experiences in a cross-platform environment using virtual agents.

Discussion of the State of the Art

The Internet is increasingly full of content that obscures or reduces its value for many common users. User experiences can be improved through active additions, eliminations, or changes/augmentation of content in both public and private spaces. For example, a deaf or blind person with accessibility challenges is likely to find many websites or apps that are not accessible according to Americans with Disabilities Act (ADA) and Web Content Accessibility Guidelines (WCAG) and best practices (in the future including haptics and more advanced implant stimulation). This can be partially addressed or improved by dynamically generating ADA/WCAG content to supplement websites, applications, or engagements where they are lacking. Similarly, children may be exposed to a variety of content which is not age appropriate or is at odds with the expectations of their legal guardians/parents.

What is needed is a dynamic experience curation platform to address the need for tailoring user experiences to individual user needs and preferences.

SUMMARY OF THE INVENTION

Accordingly, the inventor has conceived and reduced to practice a dynamic experience curation platform utilizing statistical, machine learning, and artificial intelligence techniques, including neural networks, generative models, and neuro-symbolic approaches, to enhance user interactions with content on the Internet and privately managed networks. The platform employs an Experience Broker (EB) service to disintermediate user devices from the internet (or internal network resources), improving security and user experience. It processes content requests, extracts relevant information, filters out unwanted content like ads or inappropriate material, manages current state of user devices and content being engaged with, records historical state snapshots and content generation and engagement data, and generates curated content consistent with user preferences and other constraints on an ongoing basis. The platform's generative AI process renders content into a user interface consistent with user preferences. It allows for personalized content delivery across devices, including virtual and augmented reality environments to enhance user workflow and ease the challenges with device and context switching. The platform supports a hierarchical spectrum of personalization, allowing users to fine-tune their content consumption experience across at least one device type. Additionally, it manages user sessions across any registered devices and integrates various databases for storing user profiles, preferences, and other relevant information which may be blended, overridden, or supersede additional constraints or preferences by additional relevant parties. This may also consider physical or network location. As an example, this would allow employer constraints to override personal preferences while connected to the business network. The platform aims to provide a seamless, personalized, and more secure internet and internal network resource browsing and engagement experience even when users switch between devices including but not limited to phones, watches, AR/VR, auto, conference rooms, workstations.

According to a preferred embodiment, a computing system for dynamic experience curation using one or more virtual cross-platform agents employing a dynamic experience curation platform is disclosed, the computing system comprising: one or more hardware processors configured for: transmitting a content request to one or more content providers; obtaining the requested content from the one or more content providers; feeding the requested content or a subset thereof into a classification model to extract and classify relevant content; retrieving a plurality of user preference data; verifying an applicable preference hierarchy to determine a contextually relevant preference set active for the current content request; engineering a prompt using an output of the classification task and the plurality of user preference data; submitting the prompt and a plurality of content elements to one or more generative artificial intelligence (AI) models; and rendering, on a user interface of a user device, the output of the one or more generative AI models as curated content responsive to the content request.

According to another preferred embodiment, a computer-implemented method executed on a dynamic experience curation platform for dynamic experience curation using one or more virtual cross-platform agents is disclosed, the computer-implemented method comprising: transmitting a content request to one or more content providers; obtaining the requested content from the one or more content providers; feeding the requested content or a subset thereof into a classification model to extract and classify relevant content; retrieving a plurality of user preference data; verifying an applicable preference hierarchy to determine a contextually relevant preference set active for the current content request; engineering a prompt using an output of the classification task and the plurality of user preference data; submitting the prompt and a plurality of content elements to one or more generative artificial intelligence (AI) models; and rendering, on a user interface of a user device, the output of the one or more generative AI models as curated content responsive to the content request.

According to another preferred embodiment, a system for dynamic experience curation using one or more virtual cross-platform agents employing a dynamic experience curation platform is disclosed, comprising one or more computers with executable instructions that, when executed, cause the system to: transmit a content request to one or more content providers; obtain the requested content from the one or more content providers; feed the requested content or a subset thereof into a classification model to extract and classify relevant content; retrieve a plurality of user preference data; engineer a prompt using an output of the classification task and the plurality of user preference data; verify an applicable preference hierarchy to determine a contextually relevant preference set active for the current content request; submit the prompt and a plurality of content elements to one or more generative artificial intelligence (AI) models; and render, on a user interface of a user device, the output of the one or more generative AI models as curated content responsive to the content request.

According to another preferred embodiment, non-transitory, computer-readable storage media having computer executable instructions embodied thereon that, when executed by one or more processors of a computing system employing a dynamic experience curation platform for dynamic experience curation using one or more virtual cross-platform agents, cause the computing system to: transmit a content request to one or more content providers; obtain the requested content from the one or more content providers; feed the requested content or a subset thereof into a classification model to extract and classify relevant content; retrieve a plurality of user preference data; verify an applicable preference hierarchy to determine a contextually relevant preference set active for the current content request; engineer a prompt using an output of the classification task and the plurality of user preference data; submit the prompt and a plurality of content elements to one or more generative artificial intelligence (AI) models; and render, on a user interface of a user device, the output of the one or more generative AI models as curated content responsive to the content request.

According to an aspect of an embodiment, the user device is a first user device and the content request is received from the first user device.

According to an aspect of an embodiment, the output of the one or more generative AI models is rendered on a second user device.

According to an aspect of an embodiment, the one or more generative AI models include a Retrieval Augmentation Generation component.

According to an aspect of an embodiment, the rendered output is rendered directly or indirectly via one or more existing applications.

According to an aspect of an embodiment, the prompt comprises text, a neural network interface to an AI system, a binary object, or a machine understandable image or video format.

According to an aspect of an embodiment, the curated content comprises accessibility overlays.

According to an aspect of an embodiment, the accessibility overlays comprise text-to-speech conversion, a screen reader, alternative control/input methods, magnification and zoom, color contrast adjustment, captions and transcripts, sign language interpretation, keyboard navigation, voice control, simplified content layout, readability enhancements, visual cues and notifications, haptic feedback, and easy language and symbol support.

BRIEF DESCRIPTION OF THE DRAWING FIGURES

DETAILED DESCRIPTION OF THE INVENTION

Figure 1:
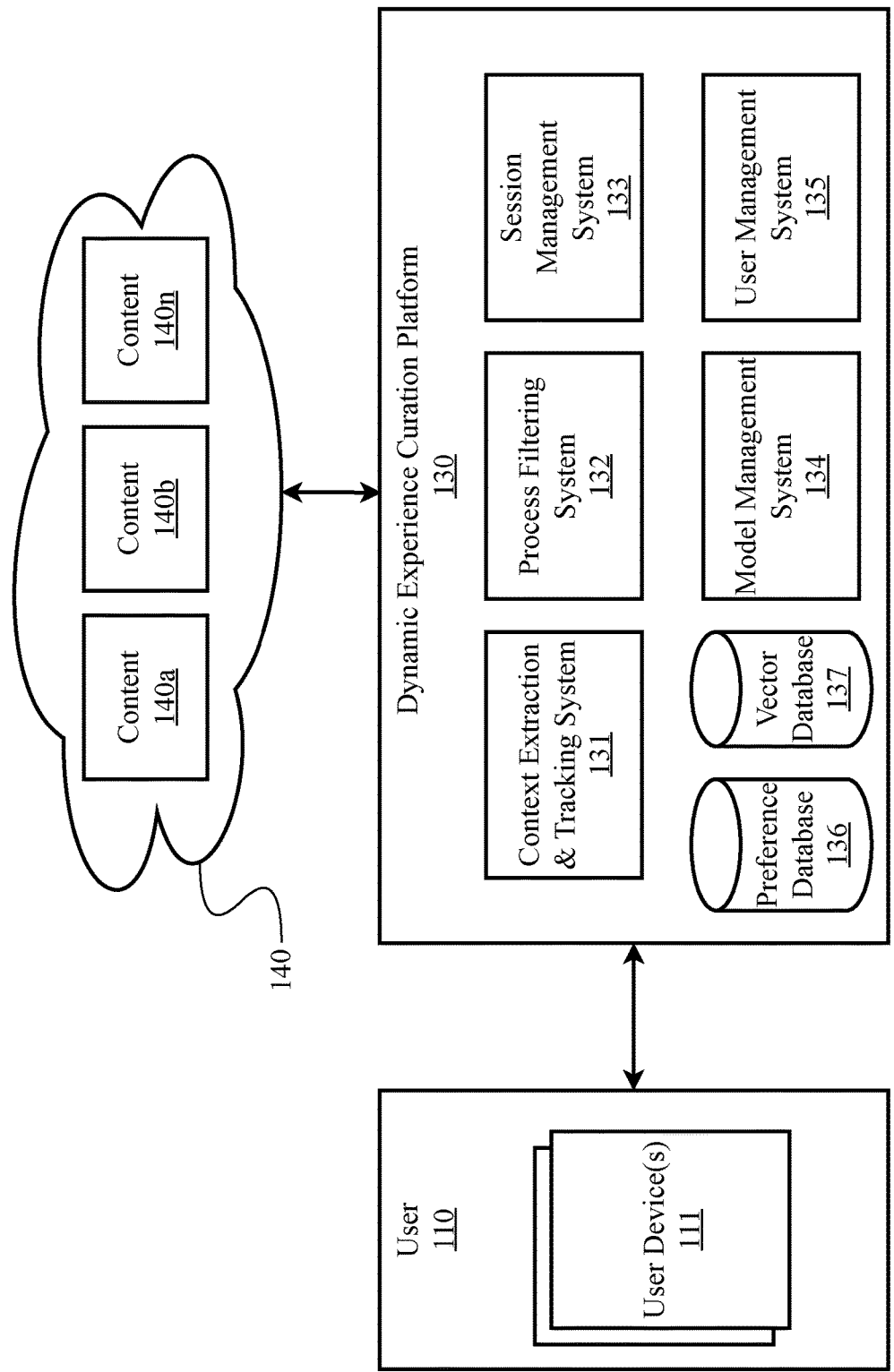
FIG. 1 is a block diagram illustrating an exemplary system architecture of a dynamic experience curation platform, according to an embodiment.

Accordingly, the inventor has conceived, and reduced to practice, a dynamic experience curation platform using virtual cross-platform agents. A dynamic experience curation platform utilizing AI and ML techniques, including neural networks and generative models, to enhance user interactions with content on the Internet. The platform employs an Experience Broker (EB) service to disintermediate user devices from the internet (or other content/information sources), improving security and user experience. It processes content requests, extracts relevant information, filters out unwanted content like ads, transforms, combines, and/or mutates existing content, and generates curated content consistent with user preferences and other constraints. The platform's generative AI process renders content into a user interface consistent with user preferences. It allows for personalized content delivery across devices, including virtual and augmented reality environments. The platform supports a spectrum of personalization, allowing users to fine-tune their content consumption experience. Additionally, it manages user sessions across devices and integrates various databases for storing user profiles, preferences, and other relevant information. The platform aims to provide a seamless, personalized, and secure content browsing experience.

An illustrative subtraction example is for children, for whom the presence of explicit material is likely to negatively impact their web/application experience. It may mean that parents, schools, institutions limit their access to network enabled devices or spy on their interactions in less than ideal manners. In their case, access, utility, and independence with privacy can be improved through a curated experience. Content augmentation/verification may be more focused on verification or alternate sourcing. Similar to PolitiFact, Bellingcat, or other services which attempt to compare source material to assess and attest to the accuracy, veracity, timeliness, and so forth, of content, the invention may improve human or machine user experiences by helping to improve the degree to which content might be relied upon for further use or as the basis for decision-making.

This disclosure focuses on dynamic experience curation for human or digital agents-which will be referred to collectively as users herein. A user may declare preferences which are stored in a database, and which may vary based on context (for example, at work versus at home, traveling versus in hometown, nighttime usage versus daytime usage, and so forth). The interactions, content, advertising, privacy, and other preferences of users are part of a broad-based and continually evolving ontological framework that supports a growing range of choices facing users in an information-rich environment. According to an aspect, user experience curation as described herein is extensible in order to address the changing needs of law, morality and (for example) public sentiment towards issues such as (for example) balancing the needs of the individual versus those of the group, public versus private knowledge and conduct, balkanization of regulations, digital versus physical spaces, and so forth.

In very technical terms, this can be thought of as building a much more comprehensive set of preferences and a formalism describing interaction choices from users across any, all, or any subset of content, applications, marketing, cookies, terms of service, privacy, network type (virtual private network (VPN), direct, or TOR), end user license agreements (EULAs), and so forth. Such preferences may be reflective of personal views (e.g. "I do or don't like explicit or violent or XYZ content") and legal considerations (e.g. "I live in this state/city/country and I travel to these places or my data is in this other place"). These preferences may even be particular to the context of the task at hand. For example, a user browsing social media and reading news may require one configuration of preferences but then switch to researching a product or planning a trip that requires a different preference set. This means for example, according to an aspect, that in the case of the web, users must be able to conduct context-aware browsing (i.e., consumption of information, not necessarily restricted to web-based content). But aspects of the invention go beyond simplistic sandboxing or incognito-type modes; user experience curation may be elevated into single-session and cross-session digital footprint analysis that may be recorded in a database and vectorized to enable more efficient processing/comparison of engagement sessions in part or in whole across or within a session.

Based on different factors, the platform may consider different types of cases where specific actions or decisions may exist in different state spaces that require evidentiary packages for authorization (e.g. purchases; entering community space; wire all my money; view health data; change my identity/account; and so forth). This again may be influenced by regulation, criminal law, and other regional or national regulatory parameters. Even innocuous examples like gambling (e.g., participating in the lottery or conducting sports betting) may have practical considerations associated with geolocation and the regulatory regime of contests and bettors.

According to some embodiments, user device switching (e.g., from laptop to VisionPro or Metaquest or vice versa) results in an event being generated and sent to the curation platform which causes the computing system to: obtain current state of user engagement and content on device 1 and determine the nature and characteristics of device 2 with respect to the same content, as required transmit a content request to one or more content providers to obtain any additional content needed to generate an equivalent or enhanced workflow based on the abilities of the new device (e.g., 3D capabilities of VisionPro might cause additional downloads when compared to 2D laptop media), feed the additional requested content or a subset thereof into a classification model to extract and classify relevant content; retrieve a plurality of preference data; engineer a prompt using an output of the classification task previously completed from device 1 inputs and the second set of outputs from the device 2 initiated classification tasks and the plurality of preference data; submit the prompt and a plurality of content elements to one or more generative artificial intelligence (AI) models; and render, on a user interface of a user device 2, the output of the one or more generative AI models as curated content responsive to the content request.

Additionally, ongoing user engagement with a first device (e.g. a VisionPro) is reinterpreted and broadcast for other mediums and devices (e.g. on a television, monitor, etc.).

According to an embodiment, platform can provide content filtering for individuals with security clearances. Within a group where secret information is present it could provide fine-grain and reliable access control. In the context of the experience curation platform, content filtering for individuals with security clearances would involve implementing a robust access control system to ensure that sensitive or classified information is only accessible to authorized users. This is particularly important in scenarios where a group of users with varying levels of security clearance collaborate or share content. An exemplary use case comprises a government agency using the experience curation platform for its internal communication and collaboration. The agency deals with sensitive information related to national security, and its employees have different levels of security clearance (e.g., confidential, secret, top secret). The platform would require users to authenticate their identity using strong authentication methods, such as multi-factor authentication (MFA), to ensure that only authorized individuals can access the system. Each user would be assigned a specific role based on their security clearance level and job requirements. These roles would determine the user's permissions and access rights within the platform. The content administration AI would classify and tag content based on its sensitivity level (e.g., confidential, secret, top secret) and the corresponding security clearance required to access it. The platform would define and enforce access control rules based on user roles, permissions, and content classification. For example, a user with a "confidential" clearance would only be able to access content classified as "confidential," while a user with a "top secret" clearance would have access to all levels of classified content. When a user accesses the platform, the content administration AI would dynamically filter the content based on the user's security clearance and permissions. Only the content that the user is authorized to access would be visible and accessible to them. The platform would maintain detailed audit trails of user activities, including content access and modifications. It would also monitor for any suspicious or unauthorized access attempts and alert the system administrators.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture of a dynamic experience curation platform, according to an embodiment. According to an aspect, one productive use of the powerful artificial intelligence (AI) and machine learning (ML) techniques including neural networks, generative adversarial networks, large language models (LLMs), and the like is to rapidly process and classify or categorize information. According to an aspect, user-operated devices 111 or applications may access curated experiences via an Experience Broker (EB) service provided by dynamic experience curation platform 130, which can disintermediate one or more user devices or applications from the Internet and may enhance the user experience while improving security of data while the user engages with services and content 140a-n via the Internet 140. This may also enable better cross-device and platform synchronization and workflows.

In a preferred embodiment, consider first current common user experiences such as normal browsing, online shopping, news, and social media. In these cases, the Experience Broker (which could be on the device, across multiple devices, or on a server or container separate from the user device(s)) engages in browsing the actual content. This content may then be rendered (e.g. could be in a headless browser that emulates a user and renders JS (JavaScript) for single page applications and basic web pages), and relevant content may be extracted from the rendered content. In some implementations, the raw, extract content may be sent to a content administration AI which can perform tasks including content filtering, content categorization and tagging, content summarization, content adaption, content linking and enrichment, content personalization, and content moderation. The extracted content, which may or may not have been processed by the content administration AI, can then be passed into a generative AI process filter that renders the source content into a user interface/user experience (UI/UX) that is consistent with the preferences in the recorded user preferences as defined in a declarative formalism. This is important because it enables the process facilitated by the Experience Broker to strip out superfluous or unwanted content (e.g., ads or harmful content) and to inject helpful content (e.g., accessibility, desired ads/deals, fact checks, etc.). It also potentially allows the user to avoid interacting with parts of the web that are outside of their intended scope (e.g. terms of service or privacy/not allowed) and can seamlessly direct (both with user notice and silently) to alternative content that is similar to the requested content but remains within the overall constraint set. This might mean the same item for purchase online but at a store that accepts Amazon Pay or Shop Pay vs PayPal/Venmo or a site that has a return policy or privacy policy consistent with desires. In some implementations, sites can create a robots.txt type file which could provide some clarification or guidance on the content or its structure. Users could choose to abide or ignore this. Its contents could include additional references, requests not to filter components, suggested filtering via rating system (PG-13 style) or other metadata/suggestion.

One benefit of content extraction followed by new curated generation, according to an aspect, is that it also allows the service or user to consider how much "reconstruction" to do. An originalist configuration or setting might preserve all photos and text from the original listing, while allowing curated augmentation. A more aggressive setting might be configured to dynamically modify the images to reflect the size of the user and replace the model with the user's likeness. This can enable more seamless shopping and analysis experiences for the user when desired or enable accurate "historical" exploration of content if so desired. This could be context specific and automated as well (for example, "shop for me but learn about historical events as they occurred").

Specialized content generation tools may be selected during the content generation phase based on the classification of the content (or segments of the content) identified during the extraction and classification elements which are passed to the generation phase of the curated content process. This information can be used to run different models in generation—that might be responsive for various licensing, cost, specialization, efficiency, timeliness, and other objectives.

According to an aspect, the same process may also be used to change the location of content generation and hosting. For example, the processes outlined herein may impact content delivery networks (CDNs) commonly used today for security and availability considerations (e.g., time to load, DDOS prevention/absorption); accordingly, it may be desirable for the content extraction, generation, or hosting to be distributed across at least one point-of-presence (POP) during the process. This may be done again based on a multitude of factors that include inputs from the content owner, the content itself, user preferences, timeliness, costs, CDN status, and any other relevant factors. This may be even more important in cases where the user is responsible for the costs of compute time/cycles/effort associated with their curated experience at the individual level or at some aggregation of users (e.g., an organization or company). For example, an enterprise may choose to have an Experience Broker on AWS or Google based on other corporate workloads and pricing. This may have advantages or disadvantages for select actions on the Web. With an open standard, it is possible to distribute such actions intelligently across federated CDNs or devices. Since this enables the system, in one preferred embodiment of the invention, to leverage a domain-specific declarative formalism for compute, transport and storage locality with resource, transformation, and content localities, users can control economic, legal, content, and provider (i.e., digital supply chain) preferences in a reproducible and auditable fashion.

According to an embodiment, location of collection could also be distributed to identify and account for any local filtering by nation state. The same internet search executed in multiple countries won't necessarily return the same set of content.

Extending user sessions based on workstreams across multiple devices (that may not be collocated) may also be advantageous, according to an aspect. While basic browser synchronization methods offered by CHROME or SAFARI offer to synchronize bookmarks, history, and some preferences, they lack sophistication for power users. Ongoing push updates to devices can enable individual user or team based user groups to remain in improved control across multiple devices and media. This is heightened in practice because even the same website could be declaratively "generated" during the content transformation process. Since user preferences declared across devices can then consume the raw core information content (e.g., text, image, sound), it can be contextualized based on the appropriate device-specific sensory engagement modalities. For example, a shopping website might look like today's common experience (e.g., Lululemon on Shopify) on web but appear as a dynamically generated native application on a mobile device (i.e., not a mobile web browsing experience with JS/CSS) and a fully immersive "VR fitting room" on a VR/AR headset. This kind of translation where the user's engagement (e.g., with a specific product) can seamlessly begin on a laptop for research, see a virtual fitting/test it out in a metaverse space (e.g., mock nightclub outfit check), and then purchase on mobile or wearable device enroute to work is a compelling future cross platform experience and engagement model.

In a preferred embodiment of the invention, the range of personalization to standardization would lie on a spectrum with intermediate states being a superposition of multiple systems. A particular user would have a particular set of preferences and configuration they apply to all content they consume. This configuration would then be taken into account with the (for example) corporate content filter which has rules that may supersede preferences set by the user. This would allow the organization to define broad rules and preferences, with the user's settings then fine-tuning them and presenting content in a form best consumed by the user. This personal content filter is an operator the user can access and integrate with from anywhere, meaning the way they experience information and content has consistency regardless of the specific method of access (e.g., phone, work laptop, augmented reality/virtual reality set). Note that these preference filters can be stored and shared and hierarchically nested, for example the NSFW corporate filter could limit a personal filter that would be subordinate at work or on work computers/internet access but the personal filter might be primary (no work filter applies) at the user's home computer/address. With the use of virtual machines (or solutions like isolated OS containers) this kind of split personalization may be contemporaneously active on devices (e.g., a BYOD laptop for an at home worker). This could also be achieved with virtual machines.

Extending these concepts to more specific applications versus general web activities requires additional domain specific configuration and/or learning. For example, preferences and rules may be established not only for how content or experiences are provided to a user, but also what the user is allowed to do, and how user actions are to be interpreted. For example, in a gaming scenario user curated user experiences could include a degree of realism of video or audio content, in some sense dictated by the hardware and software through which it will be rendered to the user but also in terms of preferences and/or rules that may be provided by the user or others (or required in certain regulatory regions or certain contexts). For example, the degree of realism of in-game violence can be curated; the acoustic range (both in frequency and amplitude) could be automatically adjusted based on a combination of users' medical conditions, surroundings (quieter in public places), time of day, psychological condition of the user, and so forth. The EB may also perform real-time language translation not just as a literal conversion, but by taking into account the intent and style of the original speech or text and how it could be relayed in a preferred language, and/or from a particular region, culture, or style. As another example of how the Experience Broker service could be more of an dynamic user experience curation platform, responses by an LLM to user queries may be edited after generation by the curation platform to adopt a more historically important style (e.g., if the user is immersed in Edwardian England or the French Resistance in 1942 or the battlefields of Stalingrad, text style and content may be curated to more closely fit into the milieu—while still adhering to relevant regulatory issues based for example of the age of each user).

Additional curation possibilities will be appreciated according to various aspects for special content types (e.g., art, books, movies, music)—especially where there are particular standards, codecs, etc. that better enable their common utilization across diverse hardware providers already. As an example, a variety of codecs are provided under the DivX standard that are suitable for different devices and settings; this idea can be generalized and extended with dynamic user experience curation platform 130 so that any content or capability can be curated both in terms of how it is presented but also in terms of what and when it is presented, what options are provided to users and how user actions are given effect, and so forth. As another example, in a gaming environment that includes strong haptic feedback (for example, motion platforms and vibration generators in racing or flight simulators may be "curated" by limiting the range of certain actions based on user preferences, medical needs, insurance regulations, and so forth).

Many enhancements and extensions of the dynamic user experience curation platform are envisioned by the inventors. For example, if users are given, through experience curation, the ability to live in a specific bubble more convincingly, then how can a user know or perceive that there is a bubble, and how can users tune the platform to minimize the existence of bubbles? For example, in a manner analogous to how LLMs do not always provide the "most likely next response"—because to do so would give wooden and non-natural sounding results—the curation platform may allow users to specify or influence how "hard" their bubble is. That is, should no viewpoints known to be adverse to a user's strongly stated (in word or in action) preferences be provided in the user experiences by the curation platform (a very hard bubble), or should only a slight bias toward "in line with my views" inputs be used, possibly regulated by a fact-based reputation score (e.g., "I want to be exposed to factually reliable, and not too extreme liberal/conservative/globalist/nativist views or content almost as much as I am to my more natural stuff."). This kind of approach could be offered for state- or country-level filters on content to avoid breaking laws. It can also improve content filtering for children with "child lock" content safety bumpers. For example, the platform could ensure that users in Russia are not exposed to legal risk by viewing materials disparaging the Soviet Union's actions in World War 2, while users in Poland would get quite a different treatment-consider simply the hot button issue of "Katyn Forest 1940" to imagine how differently the curation platform will perform for Russian and Polish users (and of course many other types of users, and not only based on nationality or religious viewpoint, but many other factors such as sex, military orientation/experience, knowledge level of relevant history, degree of engagement with issues such as Soviet imperialism, Russian/Polish hostility, antisemitism, and so forth).

According to some aspects, dynamic experience curation platform 130 may be implemented as a single integrated platform computer system where all computing resources, including hardware, software, and data, are centralized and managed within a single physical or virtual environment. In this arrangement, there is typically one central processing unit (CPU), memory, storage, and other resources that serve all computing needs. In other aspects, dynamic experience curation platform 130 may be implemented as a distributed platform where computing resources are distributed across multiple interconnected computers or nodes, often geographically dispersed. In a distributed platform, each node can have its own CPU, memory, storage, and other resources, and they work together to achieve to provide content curation for platform users.

According to the embodiment, dynamic experience curation platform 130 comprises various components which support and provide capabilities directed to experience curation for platform users 110. A user management system 135 is present and configured to provide a portal for each user to create and manage their own user profile. A user profile may be created and stored in a preference database 136. The user profile may comprise information associated with the user including, but not limited to, user contact information (e.g., name, email address, address, IP address, etc.), demographic information (e.g., age, ethnicity, political party, etc.), login information (e.g., username and password), and a plurality of preferences. A user 110 may provide this information and their preferences via user management system 135. A user 110 may provide this information to platform 130 via a website or web application accessible via an appropriate Internet browser operating on a user device 111 or by using a mobile device experience curation software application (App) to access platform 130. A user 110 may have multiple user devices 111 which can be used to access the platform and received curated content. For example, a user 110 may have a work computer, a personal computer or laptop, a mobile device (e.g., smart phone or tablet), a smart wearable device, and/or virtual reality/augmented reality (VR/AR) headsets.

According to the embodiment, a user 110 can submit a content request to dynamic experience curation platform 130 to access some type of content 140a, 140b, 140n accessible via the Internet 140. A context extraction and tracking system 131 is present and configured to receive the content request from a user device 111, format the request and submit it to the service provider/content provider on the user's behalf, receive un-curated content from the service provider/content provider, and extract and classify relevant content from the received un-curated content. Additionally, context extraction and tracking system 131 may receive device context or state data such as, for example, device type, operating system, device model, screen resolution, IP address, browser type and version, cookies, device ID, sensor data, location data, battery level, metadata from file, and/or the like. In some implementations, the extracted and classified content data and/or device context data may be stored in a database (e.g., preference database 136). Context extraction and tracking system 131 may send classified content and context data to a process filtering system 132. According to some embodiments, context extraction and tracking system 131 may be configured to obtain user interaction and/or feedback data associated with a user's curated experience. This information may be stored in a user profile and used for model training purposes and/or other platform 130 applications.

According to the embodiment, a process filtering system 132 is present and configured to obtain a plurality of information comprising at least user preference data, classified content, and context data and to use the obtained plurality of information as an inputs to create one or more filters which can be used to curate the user's experience when browsing the web. Process filtering system 132 can receive this information and utilize the one or more filters to render the user-requested content in a UI/UX on the user device 111. In some implementations, the filters may be rule-based, generative AI/ML based, or some combination thereof.

According to some embodiments, process filtering system 132 may be configured to filter out AI generated content explicitly tagged via frameworks (e.g., Coalition for Content Provenance and Authenticity) or based on real-time analysis of the media (request content) returned. For example, there may be rules/preferences which cause process filtering system 132 to "Filter out media that scores over 85% on an 'AI generated score chart'". This may be implemented by integrating with a content registry of AI generated content.

Platform 130 may implement various generative AI content filtering processes including, but not limited to, content failing to meet a score which is computed on content classification, content comparisons to external registries, content comparisons to knowledge bases (i.e., truthfulness against authoritative sources), presence of select material based on user settings and context (e.g., NSFW, racist/sexist, illegal content). System or user defined processing of content can enable things such as: content replacement with description of content and why it is not being shown w/option to show anyway; FPO media placement notice with or without description but no explanation; alternative content that is similar in meaning/content but scores high enough and doesn't trip any "red line" settings (e.g. illegal or work specific policies); a "carousel" of related content (similar to a Pinterest page) of potential alternatives/related sources/content that the user can select from to help refine their ongoing media filter/replacement guidelines. This subsystem routine can then be used as a semi-supervised ML process to help w/ongoing refinement of content replacement/filters unique to the user.

In some implementations, curated content may comprise accessibility overlays such as, for example, text-to-speech conversion, a screen reader, alternative control/input methods, magnification and zoom, color contrast adjustment, captions and transcripts, sign language interpretation, keyboard navigation, voice control, simplified content layout, readability enhancements, visual cues and notifications, haptic feedback, and easy language and symbol support. This can improve the experience for users with disabilities when they access and engage with digital content.

A model management system 134 is present and configured to obtain, train, and/or maintain one or more generative AI or ML models which may be used by process filtering system 132 to generate curated content on a user device 111, according to an embodiment. For the use case directed to curating a user's experience with the Internet there are several types of generative AI systems that could be used to curate and render content on a custom web page (or some other type of representation such as a mobile app render, an AR/VR environment, etc.). One or many possible examples can include a conditional image generation system which generates images based on conditional inputs such as, for example, generating different versions of a product image based on user preferences. As another example, while not strictly generative, recommender systems can dynamically curate content for a web page based on user preferences and behavior.

In some implementations, the generative AI models may be configured to operate with Retrieval Augmented Generation (RAG) components. Adding a retrieval augmented generation (RAG) component to the generative AI models can significantly benefit the experience curation platform in several ways. RAG allows the AI models to retrieve and incorporate relevant information from external knowledge sources, such as databases or documents, during the content generation process. This ensures that the generated content is more accurate, up-to-date, and relevant to the user's context and preferences. By leveraging a wide range of external knowledge sources, RAG can help the AI models generate more diverse and creative content. This can lead to a more engaging and interesting user experience, as the platform can offer a broader range of perspectives, ideas, and recommendations. RAG can help streamline the content generation process by allowing the AI models to quickly locate and extract relevant information from external sources, rather than relying solely on their internal knowledge representation. This can result in faster content generation and curation, enabling the platform to serve users more efficiently. RAG can be particularly beneficial when dealing with niche or highly specific topics that may not be well-represented in the AI models' training data. By retrieving information from specialized knowledge sources, the platform can provide more accurate and comprehensive content on these topics. With RAG, the AI models can incorporate information from external sources that may not have been part of their initial training data. This reduces the platform's reliance on extensive and constantly updated training datasets, making it more scalable and adaptable to new content domains. By retrieving information from user-specific knowledge sources, such as personal documents or preferences, RAG can enable the platform to generate highly personalized content tailored to each user's unique needs and interests.

According to the embodiment, a session management system 133 may be configured to support a user's curated experience between and across multiple user devices 111. Session management systems 133 may manage a user session across multiple devices. In some implementations, this may comprise steps involving assigning a unique user identifier (ID) (e.g., username, email address, or generated ID, etc.) to identify the user consistently across devices and sessions; generating a session token (e.g., JSON web token or session ID) when the user logs in or starts a session (e.g., submits a request for content), which may be stored on the client-side (e.g., in cookies or local storage) and sent with each request to identify the session; keeping track of session state and store relevant information such as user ID, session token, device information/state, and session timing data (state and expiration); providing cross-device synchronization which may involve updating session state whenever it changes on one device and propagating those changes to the other devices; and implementing session expiration to ensure sessions are not kept open indefinitely. Furthermore, session management system 133 may implement secure communication protocols (e.g., HTTPS) to protect session tokens from being intercepted. Additional security measures such as device verification or multi-factor authentication may be implemented, according to some embodiments. User's may be given control over their sessions such as the ability to log out from devices 111 or revoke access to certain devices.

In some implementations, session management system 133 can be configured to provide functionality for seamlessly transitioning user engagement and content across different devices, such as from a laptop to a virtual reality/augmented reality (VR/AR) device, or from a desktop computer to a television, and/or the like. When a user switches devices, the system generates an event that triggers a process. According to an aspect, the process may begin by obtaining the current state of user engagement and content on the first device. The nature and characteristics of the second device are determined in relation to the same content. If necessary, additional content is requested from content providers to generate an equivalent or enhanced workflow based on the capabilities of the new device (e.g., 3D capabilities of VisionPro, 8K display on a television, etc.). The additional content can be fed into a classification model to extract and classify relevant information. User preference data is retrieved. A prompt is engineered using the outputs from the classification tasks performed on both devices and the user preference data. The prompt and content elements are submitted to generative AI models. The output of the generative AI models is rendered on the user interface of the second device as curated content responsive to the content request.

Additionally, ongoing user engagement with a device like VisionPro can be reinterpreted and broadcast for other mediums and devices, such as televisions or monitors. That is, the content generated on the second device may be re-curated and rendered on a third, fourth, etc. device. For example, consider screen sharing for local audiences such as watching a VR player in a racing sim at home on a television screen. As another example, consider an eSports broadcast on a streaming platform (e.g., Twitch) wherein curation platform 130 can reinterpret what is happening on the stream with additional, curated content and/or context on or across multiple devices.

A user switching devices is a simple example of a triggering event for such a cross-device content transitioning, such as moving from a laptop to a VR/AR device, or vice versa. However, there could be other potential triggering events within the context of the described experience curation platform including, but not limited to, user login and authentication on a new device; user initiating a new task or workflow on the current device; user pausing or saving their progress on one device; scheduled to time-based events (e.g., a daily content update); location-based events (e.g., user moving from home to office); user preferences or settings; system detecting a change in user behavior or engagement patterns; external triggers from third-party services or platforms (e.g., receiving a notification or message); device battery level reaching a certain threshold; network connectivity changes (e.g., switch from Wi-Fi to cellular data). These triggering events could prompt the system to reevaluate the user's context, preferences, and device capabilities to curate and render the most appropriate content for the user's current situation.

According to the embodiment, one or more databases may be present and configured to store a plurality of information obtained from various sources such as users 110, user devices 111, and service providers and content providers 140a-n accessible through a communication network such as the Internet 140. Some exemplary databases that may be implemented in some embodiments include, but are not limited to, relational databases, key-value stores, document databases, graph databases, vector databases, time-series databases, and column-family stores, to name a few.

A preference database 136 is present and configured to store a user profile and a plurality of user preferences which may be explicitly defined/declared by the user and/or implicitly learned/derived from user behavior and interactions. Preference database 136 may also store rules or policies or other legal considerations which may be applicable to a user and/or requested content based on preferences, location, age, or any other constraint. These rules/legal considerations may be set forth by a company (e.g., corporate policy on what type of content employees are allowed to access or share) or a government/regulatory entity (e.g., local, state, or national laws) or some other type or authority. For example, parents could create a filter for their children which curates content to remove NSFW or explicit material and which also formats the content so that it is at the appropriate reading level for the child.

According to the embodiment, a vector database 137 is present and configured to store a plurality of embedded data (i.e., vectors) comprising at least one or more of content requests, un-curated content, extracted and classified content, curated content, device context, and user preferences. A vector database stores vectors, which are mathematical representations of data points in a multi-dimensional space. Each vector typically represents a feature or an entity, and the database is optimized for storing, querying, and manipulating these vectors efficiently. The information stored in vector database 137 may be leveraged by platform 130 for use in machine learning, data mining, content extraction and classification, and similarity search processes. Each vector may be associated with a unique identifier and can be of fixed or variable length.

Figure 2:
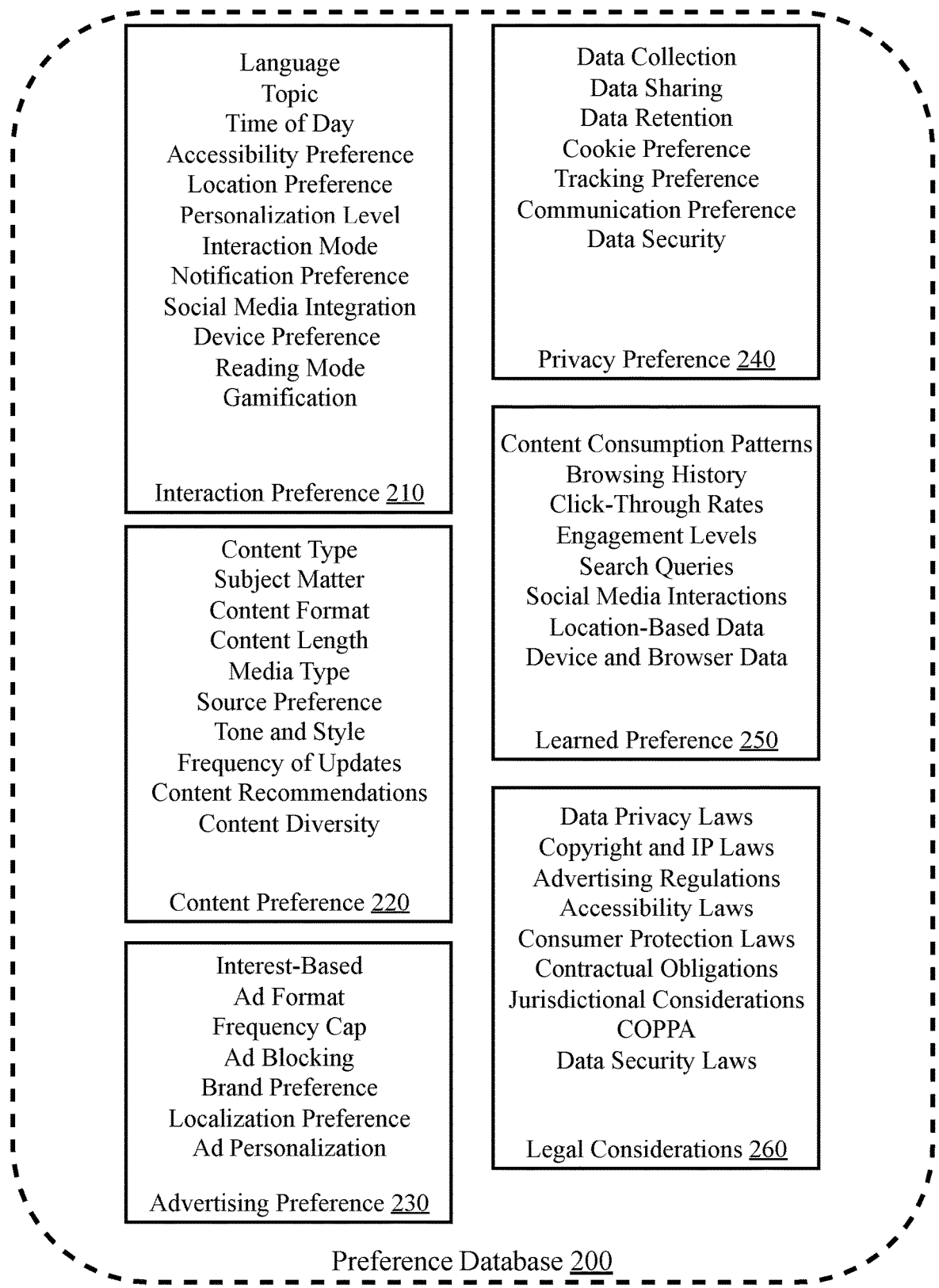
FIG. 2 is a block diagram illustrating an exemplary aspect of a dynamic experience curation platform, a preference database.

FIG. 2 is a block diagram illustrating an exemplary aspect of a dynamic experience curation platform, a preference database 200. According to the aspect, preference database 200 may be stored in local storage on a user device 111, in a centralized data storage system (e.g., corporate server), in a cloud-based storage provided by platform 130, or distributed between these or other storage systems. According to the aspect, preference database 200 may be configured to store a plurality of user preference data 210-260. The user preference data may be received, retrieved, or otherwise obtained from a user 110 and/or their user device(s) 111. For example, during an initial interaction/registration with dynamic experience curation platform 130 a user can submit preferences during creation of their user profile. In some aspects, the user may be able to submit preferences in the form of a questionnaire and/or survey which may be text-based (e.g., question and response) or interactive with a generated voice which asks the user questions and the user can speak their response or may be gamified so that the user can submit preferences in a manner which resembles a game (e.g., on a touch screen enabled device using a finger to drag a preference from a list of preferences across the screen and "drop" it into a preference category bucket). Some preferences may be learned, inferred, or otherwise derived by platform 130 by analyzing at least user behavior and session state data.

According to the aspect, preference database 200 may store a plurality of user interaction preferences 210. The illustration provides some exemplary (non-limiting) interaction preferences. Users may prefer content in a specific language. This preference can be used to show content in the user's preferred language when available. Users may be interested in specific topics, such as technology, sports, or fashion. This preference can be used to show content related to the user's preferred topics. Users may have different preferences for content based on the time of day. For example, they may prefer news content in the morning and entertainment content in the evening. Users may have accessibility preferences, such as preferring high contrast or larger fonts. These preferences can be used to render content in a way that is more accessible to the user. Users may have preferences based on their location, such as local news or events. This preference can be used to show content relevant to the user's location. Users may have preferences for how personalized they want their content to be. Some users may prefer highly personalized content, while others may prefer less personalized content. Users may prefer different interaction modes, such as touch, voice, or keyboard input. This preference can be used to provide alternative interaction methods for users with different preferences or accessibility needs. Users may have preferences for receiving notifications, such as email alerts or push notifications. This preference can be used to determine how and when to notify the user about new content or updates. Users may have preferences for integrating social media content, such as displaying their social media feeds or sharing content on social media platforms. This preference can be used to customize a rendered web page's social media integration features. Users may prefer viewing content on specific devices, such as smartphones, tablets, smart wearables, AR/VR devices, or desktop computers. This preference can be used to optimize the layout and design of the rendered content for the user's preferred device. Users may have preferences for reading modes, such as light or dark mode, or preferences for font styles and sizes. This preference can be used to customize the rendered content's appearance to match the user's reading preferences. Users may have preferences for gamification elements, such as badges, rewards, or leaderboards. This preference can be used to incorporate gamification elements into the rendered content to enhance user experience and engagement.

According to the aspect, preference database 200 may store a plurality of user content preferences 220. The illustration provides some exemplary (non-limiting) content preferences. Users may prefer certain types of content, such as articles, videos, or images. This preference can be used to prioritize the display of the user's preferred content type. Users may have preferences for specific topics or subjects, such as technology, politics, sports, or entertainment. Content related to these topics can be prioritized for the user. Users may prefer certain content formats, such as articles, videos, podcasts, or infographics. The web page can prioritize displaying content in the user's preferred format. Users may prefer shorter or longer content based on their reading habits and time constraints. The platform 130 can adjust the length of content displayed based on the user's preference. Users may prefer different types of media, such as images, gifs, or interactive elements. The rendered content can tailor the media displayed to match the user's preferences. Users may prefer content from specific sources or authors that they trust or enjoy. The rendered content can prioritize displaying content from these sources. Users may prefer content with a certain tone or style, such as formal, casual, humorous, or informative. The rendered content can adjust the tone and style of content displayed based on the user's preference. Users may prefer to see content that is updated frequently or prefer a more static content experience. The platform can adjust the frequency of content updates based on the user's preference. Users may prefer to receive personalized content recommendations based on their browsing history or interests. The platform can provide content recommendations tailored to the user's preferences. Users may prefer a diverse range of content or prefer to focus on a specific niche. The rendered content can adjust the diversity of content displayed based on the user's preference.

According to the aspect, preference database 200 may store a plurality of user advertising preferences 230. The illustration provides some exemplary (non-limiting) advertising preferences which may be used to construct one or more experience curation filters. Users may prefer to see ads that are relevant to their interests and hobbies. The filter can use browsing history or user input to tailor ads to the user's interests. Users may prefer certain ad formats, such as banner ads, native ads, or video ads. The filter can prioritize displaying ads in the user's preferred format. Users may prefer to limit the number of ads they see in a given time period. The filter can adjust the frequency of ads based on the user's preference. Users may prefer to block certain types of ads, such as pop-up ads or auto-play video ads. The filter can respect these preferences and refrain from displaying blocked ad types. Users may prefer ads from certain brands or companies that they trust or have a positive opinion of. The filter can prioritize displaying ads from these brands. Users may prefer to see ads that are relevant to their location, such as local deals or events. The filter can use geolocation data to tailor ads to the user's location. Users may have preferences for how personalized they want their ads to be. Some users may prefer highly personalized ads (e.g., generating images of the user wearing the times they are currently viewing), while others may prefer less personalized ads.

According to the aspect, preference database 200 may store a plurality of user privacy preferences 240. The illustration provides some exemplary (non-limiting) privacy preferences which may be used to construct one or more curation filters. Privacy preferences allow for users to control how their data is collected, used, and shared. Users may prefer to limit the collection of their personal data, such as browsing history, location data, or demographic information. The filter can respect these preferences and only collect necessary data for providing services. Users may prefer to limit the sharing of their personal data with third parties, such as advertisers or data brokers. The filter can respect these preferences and refrain from sharing user data without explicit consent. Users may prefer that their personal data is not retained for longer than necessary. The filter can respect these preferences and delete user data after a specified period or when it is no longer needed. Users may prefer to manage their cookie settings, such as accepting only necessary cookies or blocking all cookies. The filter can provide options for users to manage their cookie preferences. Users may prefer to opt out of tracking technologies, such as tracking pixels or browser fingerprinting. The filter can acknowledge these preferences and refrain from using these technologies. Users may prefer to limit the communication they receive from the web page, such as marketing emails or notifications. The filter can provide options for users to manage their communication preferences. Users may prefer that their personal data is stored and transmitted securely. The platform can use encryption and other security measures to protect user data.

According to the aspect, preference database 200 may store a plurality of user learned preferences 250. The illustration provides some exemplary (non-limiting) learned preferences which may be used to construct one or more curation filters. Learned or inferred preferences may be based on the analysis of user behavior, interactions/sessions, and historical data. By analyzing the types of content a user consumes regularly (e.g., articles, videos, podcasts), the platform can infer the user's preferences and recommend similar content. Analyzing the user's browsing history can reveal their interests and preferences for specific topics, which can be used to personalize content recommendations. By tracking the user's click-through rates on different types of content or ads, the platform can infer their preferences and prioritize similar content in the future. Analyzing the user's engagement levels with different types of content (e.g., time spent, interactions, cross device sessions, etc.) can help the platform infer their preferences and adjust content recommendations accordingly. Analyzing the user's search queries and/or content requests can provide insights into their interests and preferences, which can be used to customize search results and content recommendations. Analyzing the user's interactions on social media platforms (e.g., likes, shares, comments) can reveal their preferences for content and brands, which can be used to curate content. Analyzing the user's location data can provide insights into their preferences for local events, news, and services, which can be used to personalize content. Analyzing the user's device and browser data (e.g., type of device, browser history) can provide insights into their preferences for content formats and presentation styles. Analyzing the user's behavior over time (e.g., daily, weekly, seasonal patterns) can help infer their preferences for content consumption at different times, which can be used to schedule content delivery. Analyzing the user's feedback and ratings on content can provide direct insights into their preferences and help improve content curation.

According to the aspect, preference database 200 may store a plurality of legal considerations 260. The illustration provides some exemplary (non-limiting) legal considerations which may be used to construct one or more curation filters. Compliance with data privacy laws, such as the General Data Protection Regulation (GDPR) in Europe or the California Consumer Privacy Act (CCPA) in the United States, requires obtaining consent for data collection and processing, as well as providing users with the ability to access, correct, or delete their data. Curated content must comply with copyright and intellectual property laws. Proper attribution and permissions must be obtained for using third-party content, and the fair use doctrine must be considered. Advertisements must comply with relevant advertising regulations, such as the Federal Trade Commission (FTC) guidelines in the United States. This includes disclosing sponsored content and ensuring that advertisements are not deceptive or misleading. Web content must be accessible to individuals with disabilities, as required by laws such as the Americans with Disabilities Act (ADA) in the United States and the Web Content Accessibility Guidelines (WCAG). Curated content may make certain web content more accessible for individuals with disabilities. Curated content should not engage in deceptive or unfair practices, such as false advertising or fraudulent schemes, as prohibited by consumer protection laws. If the web page is subject to contractual agreements, such as terms of service or content licensing agreements, these obligations should be adhered to in the curation process. The legal requirements can vary depending on the jurisdiction in which the platform operates and where its users are located. Compliance with local laws and regulations may be considered during the curation process.

By incorporating these and other preferences in the content curation process, rendered content can provide a more personalized and relevant experience for the user wherein the rendered content is curated based on the preferences.

Figure 3:
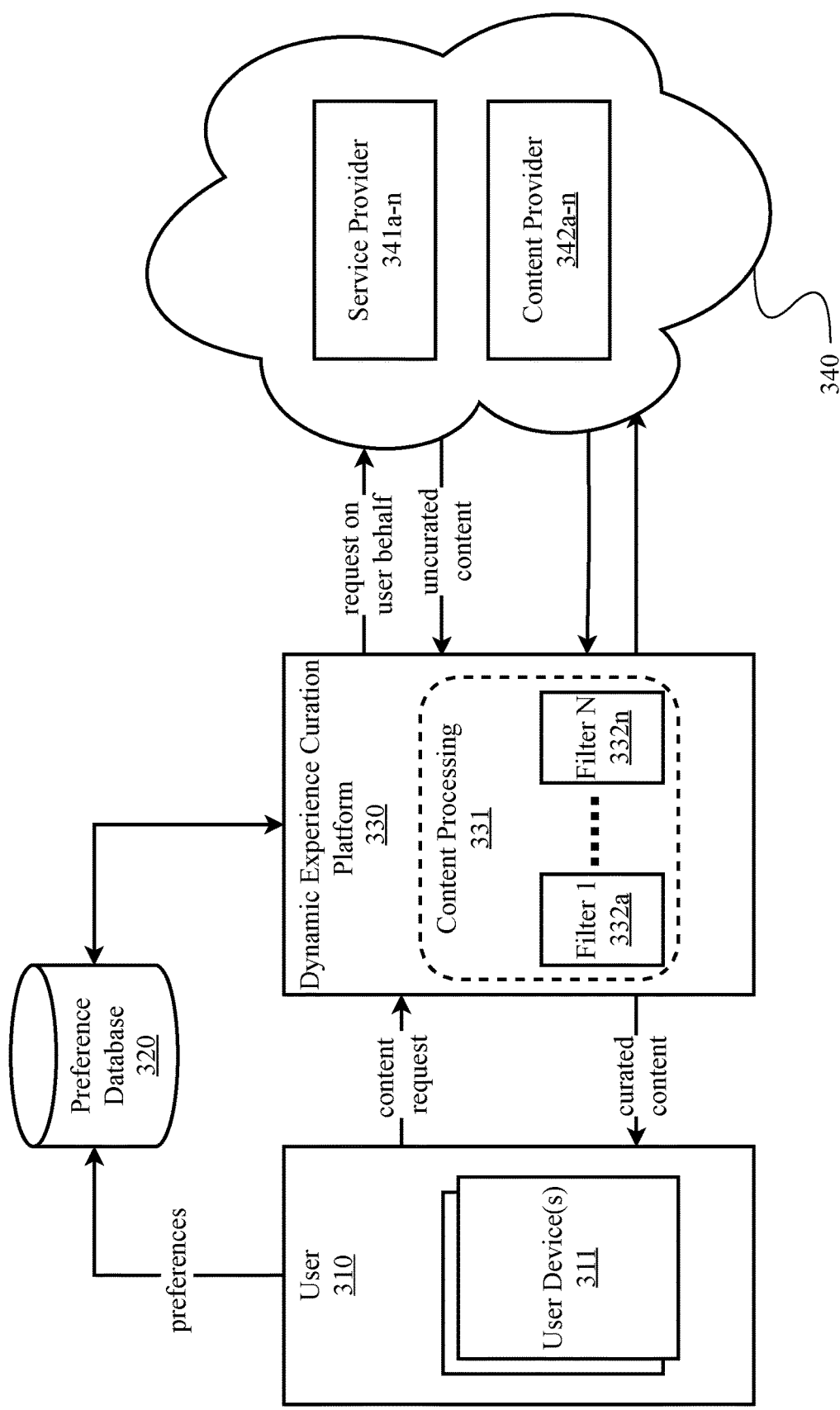
FIG. 3 is a block diagram illustrating an exemplary high-level architecture of a dynamic experience curation platform and the exchange of information among various components during dynamic experience curation, according to an aspect of an embodiment.

FIG. 3 is a block diagram illustrating an exemplary high-level architecture of a dynamic experience curation platform 330 and the exchange of information among various components during dynamic experience curation, according to an aspect of an embodiment. A user 310 can provide a plurality of user preferences which may be stored in a preference database 320. According to the aspect, a user 310 may access dynamic experience curation platform 330 via a user device 311 to submit a request for content from one or more service providers 341*a-n* and/or content providers 342*a-n* accessible via the Internet 340. Platform 330 may receive the content request and submit the request to the service provider/content provider on behalf of the user. In turn, platform 330 receives the requested content from the service provider/content provider and processes the received, un-curated content. In some implementations, the processing 331 of the received content may comprise extracting content and classifying the content. The processing may further comprise obtaining device context data from the user device 311. The classified content, device context, and retrieved user preferences may be processed by one or more filters 332*a-n* which can produce curated content which may be rendered on a UI/UX of the user device 311.

According to the aspect, the filters 332*a-n* can range from rule-based filters to generative AI-based filters (e.g., based on AI/ML models). The filters may be thought of as specialized content generation tools which may be selected during the content generation phase based on the classification of the content (or segments of the content) identified during the extraction and classification process. This information may be used to run different models in generation (e.g., sequentially or in parallel) that might be responsive for various licensing, cost, specialization, efficiency, timeliness, etc. objectives.

Figure 4:
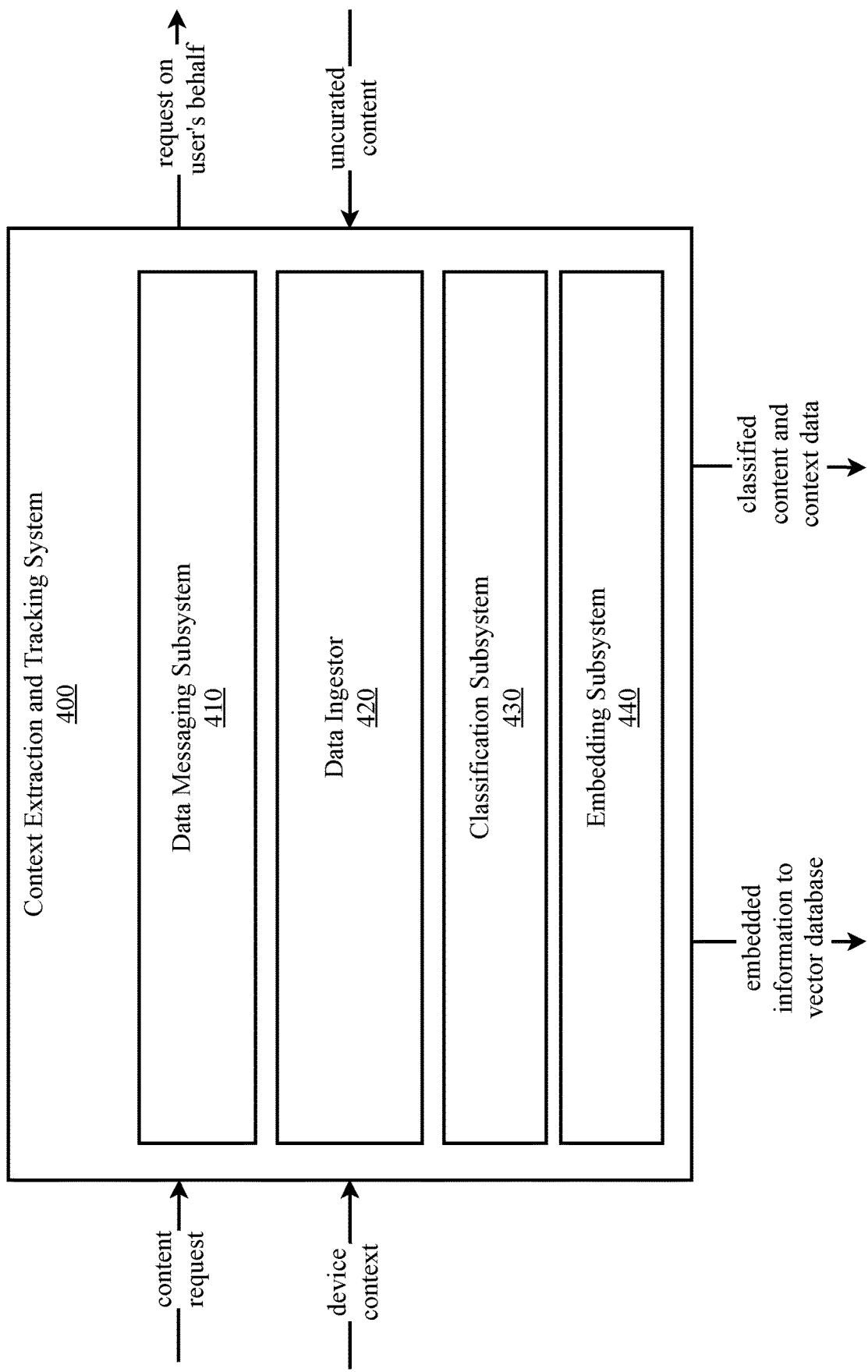
FIG. 4 is a block diagram illustrating an exemplary aspect of a dynamic experience curation platform, a context extracting/tracking system.

FIG. 4 is a block diagram illustrating an exemplary aspect of a dynamic experience curation platform, a context extraction and tracking system 400. According to the aspect, context extraction and tracking system 400 comprises a data messaging subsystem 410 configured to receive a content request from a user, format the request into a suitable format, if applicable, and submit the content request on the user's behalf to a service provider/content provider and a data ingestor subsystem 420 configured to receive the requested, un-curated content from the service provider/content provider. Data ingestor 420 may also obtain device context associated with the user device the user is currently using to engage with dynamic experience curation platform 130. Data ingestor 420 may process the received data for storage or for processing by other system 400 components. For example, un-curated content may be transformed into a format suitable for storage in a preference database.

Content requests directed to Internet content or services can take various forms, depending on the type of content and service being requested and the protocol being used. Data messaging subsystem 410 can be configured to format content requests into the appropriate format/protocol for delivery to the appropriate content creator/service provider. For example, subsystem 410 can format content requests into an HTTP request, an API request, a DNS request, an email request, and streaming request, to name a few.

According to the aspect, a classification subsystem 430 is present and configured to process un-curated content to classify the content (or segments of the content). Classification subsystem 430 may utilize defined categories or topics that are relevant to the user preferences and content request. For example, if a user is interested in sports, technology, and fashion, then these would be defined categories for the user. Web-scraping techniques may be used to extract content from the received content (e.g., web page).

This can include text, images, and other relevant information. In some implementations, natural language processing (NLP) techniques may be used to analyze the extracted text. This could involve tasks such as keyword extraction, sentiment analysis, and named entity recognition. Classification subsystem 430 may utilize machine and/or deep learning models to classify the content into the defined categories. This could involve model management system 134 training a model on a labeled dataset of content that has been manually classified into the categories of interest. Next, the user preferences may be mapped to the categories. For example, if the user prefers sports content, the system can map the sports category to the user preference. Based on the classification results and the preference mapping, platform 130 can curate the content to display on a personalized web page. This could involve prioritizing content from categories that match the user preferences and filtering out content from categories that are less relevant to the user. Context extraction and tracking system 400 may send classified content and context data to filter processing system 132 where the web page may be curated based on one or more preference filters.

According to the aspect, an embedding subsystem 440 is present and configured to use one or more embedding models to vectorize various types of data obtained and analyzed by platform 130. A user content request and device context data may be vectorized and stored in a vector database. Likewise, un-curated content and curated content may be vectorized by embedding subsystem 440 and stored in vector database. Vectorizing data allows it to be easily processed by the various AI and deep learning models implemented by platform 130. The embedded data may be used in various applications by platform 130 including, but not limited to, similarity search, recommendation systems, natural language processing, and computer vision tasks. Embedding models are widely used in natural language processing (NLP), recommendation systems, and other machine learning applications to represent words, phrases, or items in a continuous vector space. Some exemplary embedding models include word embeddings (e.g., Word2Vec), sentence/document embeddings (e.g., Doc2Vec), item embeddings for recommendation systems (e.g., matrix factorization, neural collaborative filtering), graph embeddings (e.g., Node2Vec), and knowledge graph embeddings (e.g., TransE).

Figure 5:
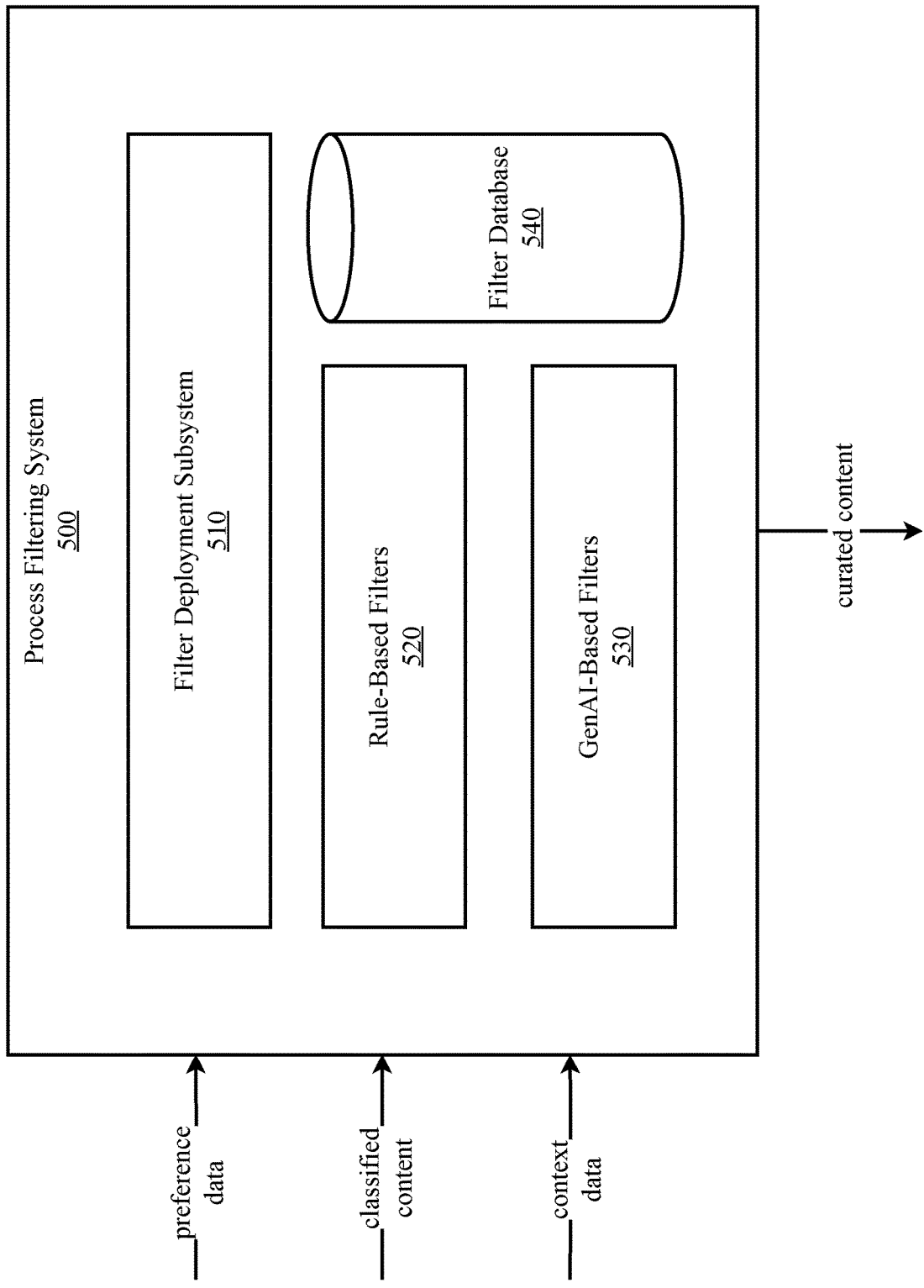
FIG. 5 is a block diagram illustrating an exemplary aspect of a dynamic experience curation platform, a process filtering system.

FIG. 5 is a block diagram illustrating an exemplary aspect of a dynamic experience curation platform, a process filtering system 500. According to the aspect, process filtering system 500 is configured to receive, retrieve, or otherwise obtain preference data, classified content, and context data and apply one or more filters based on the obtained data to declaratively generate curated content which may be rendered on the UI/UX of a user device 111. According to the aspect, a filter deployment subsystem 510 is present and configured to manage the selection and application of filters to the requested content to produce curated content based on the selected filters. Filter deployment subsystem 510 may select specialized content generation tools (i.e., preference filters) during the content generation process based on the received classified content (or segments of content) identified during the extraction and classification processes. This information may be used to run different models in generation that might be more responsive to specific objectives (e.g., licensing, cost, specialization, efficiency, timeliness, etc.). These models may run in parallel or sequentially and their outputs or model results compared against each other. In such embodiments, filter deployment subsystem 510 may select one or more model outputs to be used to curate the content.

According to various aspects, filters may be referred to as virtual cross-platform agents because they may be deployed across multiple user devices and provide a consistent user experience when engaging with content.

According to various aspects, filter deployment system 510 may be further configured to manage the sharing and access to stored filters in a filter database 540. A user may have multiple preference filters associated with or applicable to his or herself. For example, a user may have a personal filter, a work/corporate filter, a social filter, and a family filter (which may be applied to a child device to curate the child's experience with online media based on rules and preferences established by a parent/guardian) which may exist together simultaneously and inform the curation process. As noted before, when a user has one or more filters applicable to them, the filters may be applied to the user in a hierarchical method based on various constraints that may cause one filter to supersede another such as, for example, geographic constraints, device constraints, time constraints, legal constraints, and/or the like.

According to the aspect, the one or more filters that can be applied to the content based on the received data can include both rule-based filters 520 and generative AI-based filters 530. Rule-based filters for curating content might involve setting specific criteria or rules to include or exclude content based on predefined conditions. Some exemplary rule-based filters can include, but are not limited to, keyword filters (e.g., include or exclude content based on the presence or absence of specific keywords or phrases), source filters (e.g., include or exclude content from specific sources or websites. For example, filter out content from unreliable sources or prioritize content from trusted sources.), date filters (e.g., include or exclude content based on the publication date. For example, could prioritize recent content or filter out outdated content.), topic filters (e.g., include or exclude content based on predefined topics or categories. For example, filter out content that is not relevant to user interests or prioritize content that matches specific topics.), length filters (e.g., include or exclude content based on the length of the content. For example, filter out long-form content if the user prefers shorter articles.), popularity filters (e.g., include or exclude content based on its popularity or engagement metrics. For example, prioritize content that has been shared or liked by a large number of users.), language filters (e.g., include or exclude content based on the language of the content. For example, filter out content that is not in user's preferred language.), and format filters (e.g., include or exclude content based on its format, such as text, images, videos, or interactive content. For example, filter out videos if user prefers to read articles.). These are just a few examples of rule-based filters 520 that can be used to curate content based on predefined criteria. By setting up these filters, a user can customize the content that is displayed to match their preferences and interests.

In some implementations, filter deployment subsystem 510 may be further configured to create a prompt to be submitted to a one or more generative AI-based filters 530, wherein the prompt is based on the received preference data, classified content, and device context data. The selected generative AI-based filters 530 may process the prompt and return as a response, curated content which can be rendered on the UI/UX of a user device 111. There are several types of generative AI systems that could be used to render curated content based on the prompt. Text-to-image generation systems can generate images based on textual descriptions. For example, a system could generate a visual representation of a product based on a written description. As another example, a web page displaying a story could be augmented with additional generated illustrations based on the text which is currently being read, thereby enhancing the user experience by providing a more immersive environment for the story reader. Another exemplary generative AI system which may be implemented is a style transfer algorithm that can be used to apply the style of one image to another. This could be used to dynamically style elements on a curated web page based on user preferences. Natural language generation systems can generate human-like text based on structured data. This could be used to dynamically generate personalized product descriptions or other textual content on a web page. As another example neuro-symbolic systems can be implemented which combine neural networks with symbolic reasoning to perform tasks that require both pattern recognition and logical reasoning. Neuro-symbolic systems could be used to dynamically generate content based on user input, preferences, and context. These are just a few examples of the types of generative AI systems that could be used to render curated content.

Figure 6:
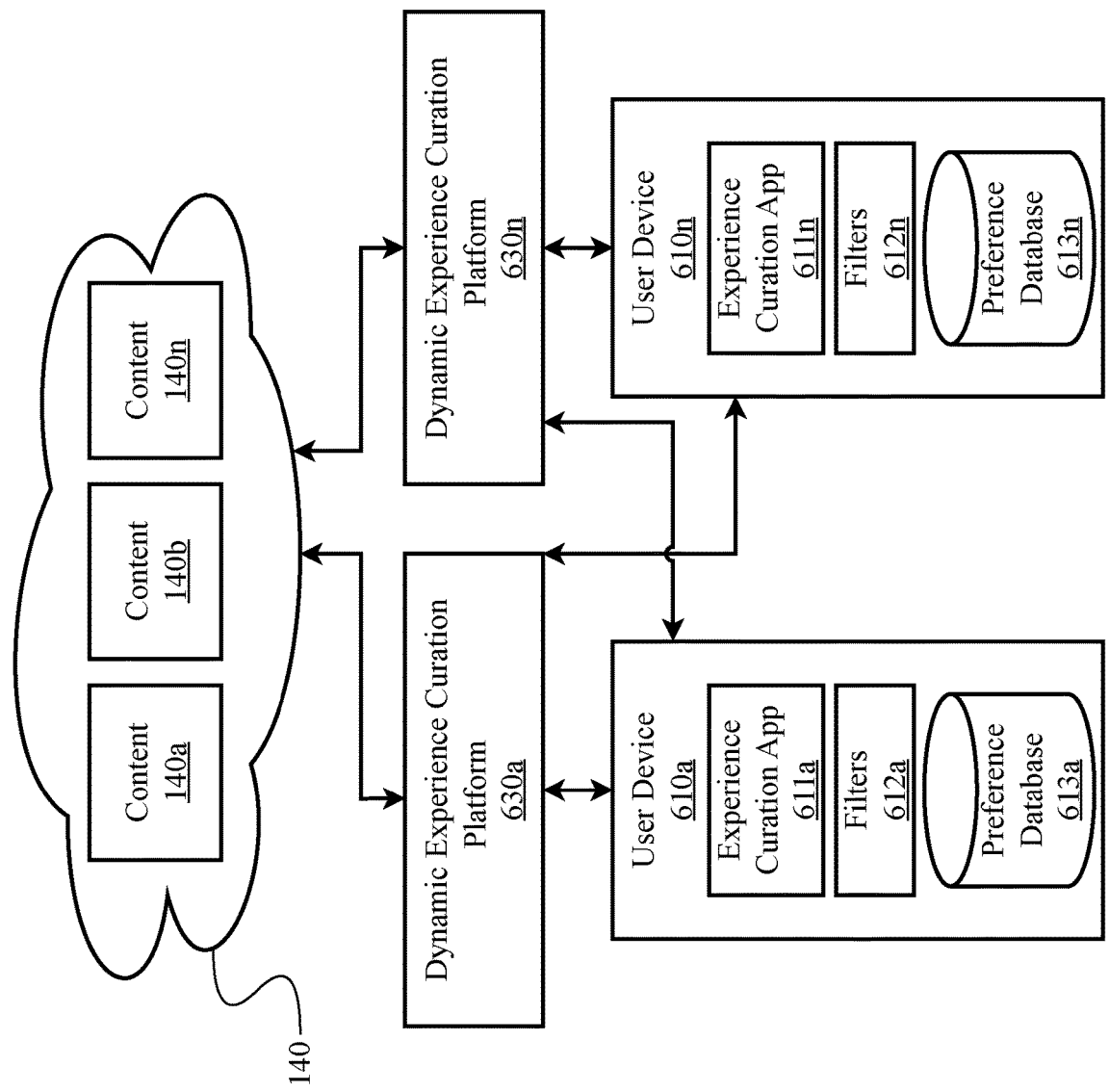
FIG. 6 is a block diagram illustrating an exemplary federated architecture of a dynamic experience curation platform, according to an aspect of an embodiment.

FIG. 6 is a block diagram illustrating an exemplary federated architecture of a dynamic experience curation platform, according to an aspect of an embodiment. Federation can be a powerful approach to improve or augment the curation platform system in several ways. By federating the platform, you can distribute the workload across multiple nodes or servers 630a-n, improving scalability. This can be particularly useful when dealing with a large number of users or when the generative AI systems require significant computational resources.

To leverage federation in the platform 630, it may be designed to support distributed computation and communication between devices and the cloud. This may involve implementing protocols for data synchronization, model updates, and collaboration between federated nodes.

Federation can help improve privacy by allowing the AI models to operate on data (e.g., preference data 613a-n) that remains on the user's device 610a-n, reducing the need to send sensitive data to the cloud for processing. This can be achieved through techniques such as federated learning, where the AI models (i.e., filters 612a-n) are trained across multiple devices without sharing raw data. Federation can enable more personalized content curation by allowing the AI models to learn from user interactions and preferences directly on the user's device. This can lead to more accurate and tailored content/recommendations over time. Additionally, by processing data and generating content closer to the user, federation can reduce latency and improve the overall user experience, especially in situations where real-time or low-latency interactions are required. Federation can enable the platform to operate offline or with limited connectivity by allowing the local AI models 612a-n to continue generating content based on locally stored data and preferences 613a-n.

As illustrated, a dynamic experience curation platform 630 may be federated and deployed across a plurality of nodes 630a-n which can provided distributed compute and storage capabilities. Each of the federated platforms 630a-n may comprise all or some of the components described with respect to FIGS. 1-5 above. Due to the distributed nature of the federated architecture, it is possible that a task may started on one node of the federation and completed on another node of the federation. The platforms 630a-n may be connected to service providers/content providers 140a-n accessible via the Internet 140. In some embodiments, when a user of a user device 610a submits a content request it may be processed by one or more instances of platform 630a-n.

According to some aspects, a user device 610a may comprise an experience curation application 611a which may be a web application or a mobile device software application, one or more filters (e.g., generative AI models), and a local instance of a preference database 613a. User device 610a may further comprise an operating system, one or more processors, a memory, a display, input device(s) (e.g., mouse, keyboard, touchscreen, etc.), embedded sensors (e.g., microphone, camera, fingerprint sensor, facial recognition system, gyroscope, Lidar, gait detection, dental record comparisons, implant/fixation device comparisons, tattoo comparisons, etc.), and other applications or microservices.

According to the embodiment, the user devices 610a-n may be used in a federated arrangement to provide edge-based computing and learning. In such an arrangement, each user device 610a may store a local instance of filters 612a and a local repository of data including preference data to perform content curation on the user device. A user can submit a request for content via experience curation app 611a which retrieves the requested content from the appropriate content provider 140a-n and then extracts and classifies relevant content from the retrieved content. User and device specific information available only to that user device may be used as inputs to the one or more filters 612a to generate curated content and display it on the user device 610a. In this way, a user device 610a may still be able to operate in conditions where an intermittent connection to a cloud-based platform 630a-n is available. Preference data may be stored locally and periodically uploaded for storage in a cloud-based preference database.

In some implementations, each of a plurality (or subset of a plurality) of user devices 610a may periodically send local AI model (e.g., preference filter) parameters to a cloud-based platform 630a-n which may aggregate the received plurality of AI model parameters and update a global version of an AI model. The updated global model parameters may then be transmitted to one or more of the user devices 610a-n where it may be operated locally as an updated local filter 612a. In this way, the federated dynamic experience curation platform architecture can provide edge learning across multiple edge devices.

Detailed Description of Exemplary Aspects

Figure 7:
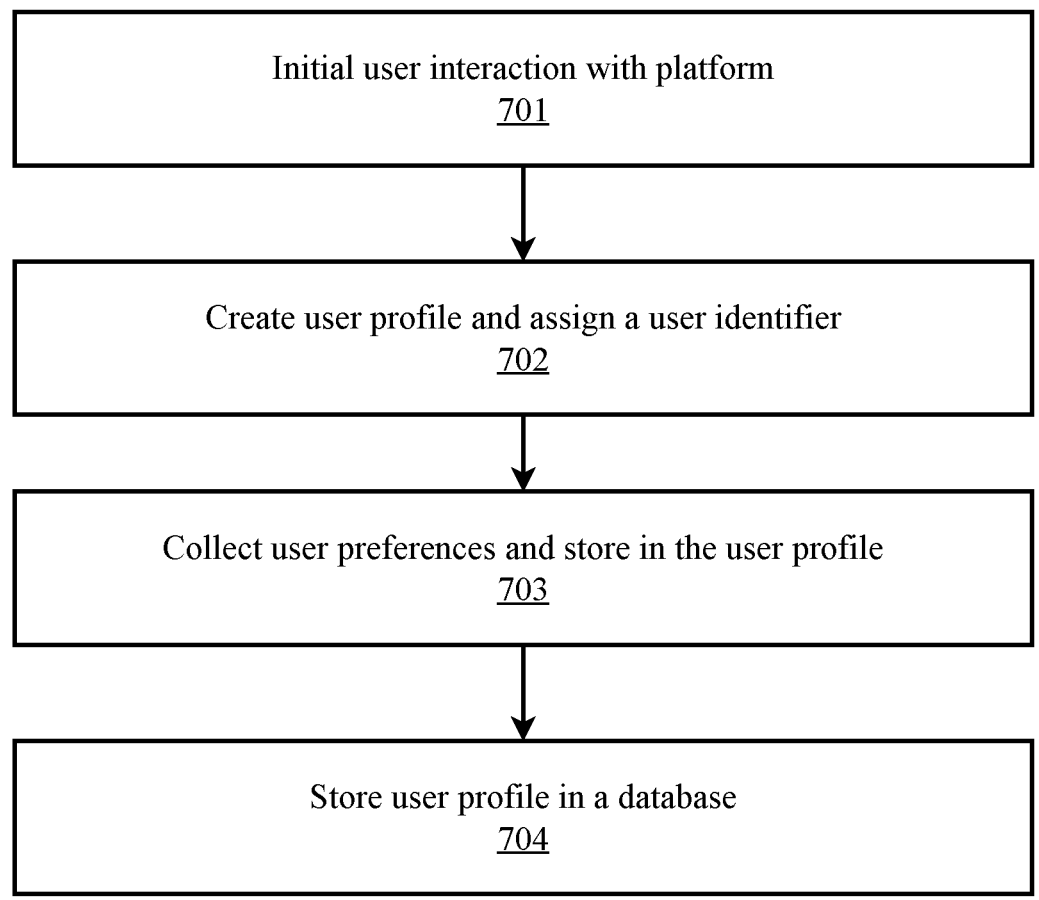
FIG. 7 is a flow diagram illustrating an exemplary method diagram for registering a user to a dynamic experience curation platform, according to an embodiment.

FIG. 7 is a flow diagram illustrating an exemplary method 700 diagram for registering a user to a dynamic experience curation platform, according to an embodiment. This exemplary method may be performed by a dynamic experience curation platform and/or one or more of its component systems or subsystems such as, for example, user management system 135. According to the embodiment, the process begins at step 701 during an initial user interaction with a dynamic experience curation platform. The initial interaction may occur via a website or web application accessible via the Internet using suitable computing device such as a personal computer or laptop. The initial interaction may occur via a software application stored and operating on a user mobile device such as, for example, a smart phone, tablet, or smart wearable device. A user may be a human individual or an automated virtual software agent. During an initial interaction with the platform, the user may be prompted to register with the platform through the creation of a user profile. At step 702 the platform creates a user profile and assigns the user a unique user identifier. Platform may gather relevant user information when creating the user profile. For example, user demographic information, username, user address (physical and/or email), and other information that can be used to register a user with the platform. A user may be asked to create a username and set a password for access to platform services. In some implementations, a username may be automatically generated and assigned to a user during user registration. A user may also be able to set user profile access and security rules such as enabling multi-factor authentication to access their account and defining who or what is able to access the information stored in their profile. Each registered user (human or virtual) may be assigned a unique user identifier which can be used to track user sessions and support cross-device dynamic content curation when a session spans multiple different user devices. In some implementations, the universally unique identifier which are 128-bit numbers that are unique across time and space. In other implementations, a user identifier may be based on a combination of user attributes, such as username, email address, and timestamp. In some embodiments, platform may hash user attributes to generate a unique identifier.

At step 703, platform collects or otherwise obtains a plurality of user preferences and stores the plurality of user preferences in the user profile. The user profile comprising the plurality of user preferences may be stored in preference database 136. In some implementations, the user profile and the preferences stored therein, or subset thereof, may be vectorized and stored in vector database 137. The user preferences may be obtained directly from the user during the registration process in various ways as discussed above. Some of the user preferences may be learned, derived, or otherwise inferred preferences that platform can determine based on, for example, patterns of user behavior, user feedback, historical session data, and/or user interactions with the platform and the curated content. Preferences and other user information stored in the user profile may be edited and updated by the user. For example, a user may add or remove preferred sources of specific types of content as their tastes or worldview changes. At a last step 704, the created user profile is stored in a suitable database such as preference database 136 and/or vector database 137.

Figure 8:
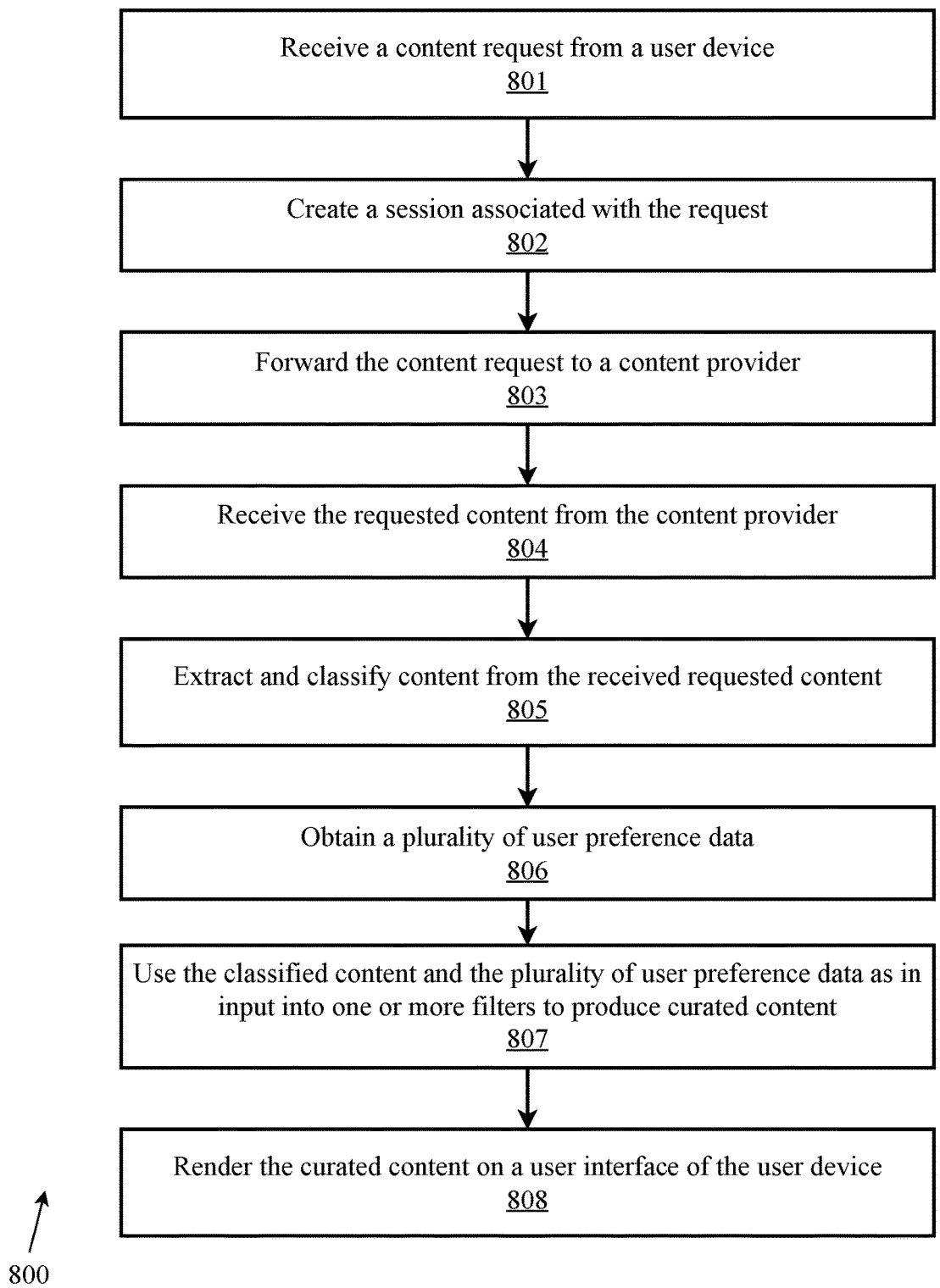
FIG. 8 is a flow diagram illustrating an exemplary method for providing dynamic experience curation, according to an embodiment.

FIG. 8 is a flow diagram illustrating an exemplary method 800 for providing dynamic experience curation, according to an embodiment. This exemplary method may be performed by a dynamic experience curation platform and/or one or more of its component systems or subsystems such as, for example, context extraction and tracking system 131 and/or process filtering system 132. According to the embodiment, the process begins at step 801 when the dynamic experience curation platform receives a content request from a user device associated with a user. The content request may be directed to content/services available on the Internet. An content/service request can refer to a request made by a user or application or virtual agent to access or retrieve content or services over the Internet. Internet content/service requests can take various forms, depending on the type of content or service being requested and the protocol being used. For the purposes of this exemplary diagram, the content request is associated with a request to search for a dress from online retailers.

If this is the first time the user has interacted with the platform, then the user may first have to register with the platform as discussed in FIG. 7. Registered users may proceed to step 802 where platform creates a session associated with the content request, wherein the session may be linked to the user via the user's unique identifier. The session, its state, and all user interaction with the platform during the session may be stored in a database and used for various purposes such as for providing data transparency for data auditing purposes, or for use in improving platform systems and processes, for example, to be used to train and update content classification and/or generation models.

At step 803, platform forwards the content request to a content provider or service provider. A content provider may be an individual or entity which is responsible for the creation of the requested content, or it may be an individual or entity which hosts, stores, and/or maintains the requested content. In cases where the requested content is available from multiple content providers, the content request may be transmitted to one or more of the multiple content providers. In such cases, platform may determine which content providers to transmit the content request based at least in part on user preference data. For example, a user may have a stated preference to not receive information from specific sources even if that source has the content requested by the user. Continuing the online shopping example, the request to search for a dress may be sent to one or more servers associated with online retailers which sell a/the dress the user is searching for.

At step 804, platform receives the requested content from the content provider. Platform may then extract content from the requested content and use one or more classification models to classify the extracted content 805. For example, if the user has a preference related to a return policy or privacy policy, then online retail sites that have policies which align with the user preferences may be selected to show to the user and/or for further curation. Relevant content from the returned requested content may be extracted. For example, images of the dress may be extracted from the returned website(s) and classified as such.

Platform may also receive, retrieve, or otherwise obtain a plurality of user preference data from preference database at step 806. Optionally, the platform may further obtain user device context information. Device context information may be used by the generation models to render curated content in a format suitable for display/output on the user device. For example, if a user device can only produce sound and haptic output, then the filter(s) can curate the content to be output in such a manner to enhance the experience of the user. This may be accomplished, for example, by returning a content request audibly which may be accomplished by using one or more text-to-speech systems and providing vibratory signals responsive to user commands. In some embodiments, the extraction process may involve breaking content into multiple segments for processing. This may be accomplished, for example, using random sampling techniques, time-based segmentation, feature-based segmentation (e.g., divide the content into segments based on specific feature or attributes), or cluster-based segmentation (e.g., divide the content into segments based on clustering algorithms such as k-means clustering), and or the like. The content, or segments of content, may be processed by one or more classification models. In some implementations, a classification model of the one or more classification models may be trained in part on training data comprising user preferences and category information. The classification model may be trained to learn a mapping between user preferences and category information, among other associations.

At step 807, the classified content and the plurality of user preference data is input into one or more filters to produce curated content. The one or more filters may be rule-based and/or AI/ML based. According to some embodiments, one or more filters may be generative AI-based filters. In such embodiments, platform may use the classified content and the plurality of user preference data to construct one or more prompts which may be submitted to one or more selected generative AI models which may output curated content based on one or more prompts. For example, the extracted images of the dress may be curated based on user preferences and other information such as by altering the images of the dress to be in the size of the user or generating an image of the user in the dress. As a last step 808, the platform renders the curated content on a UI/UX of the user device thereby providing dynamic experience curation for a user.

Figure 9:
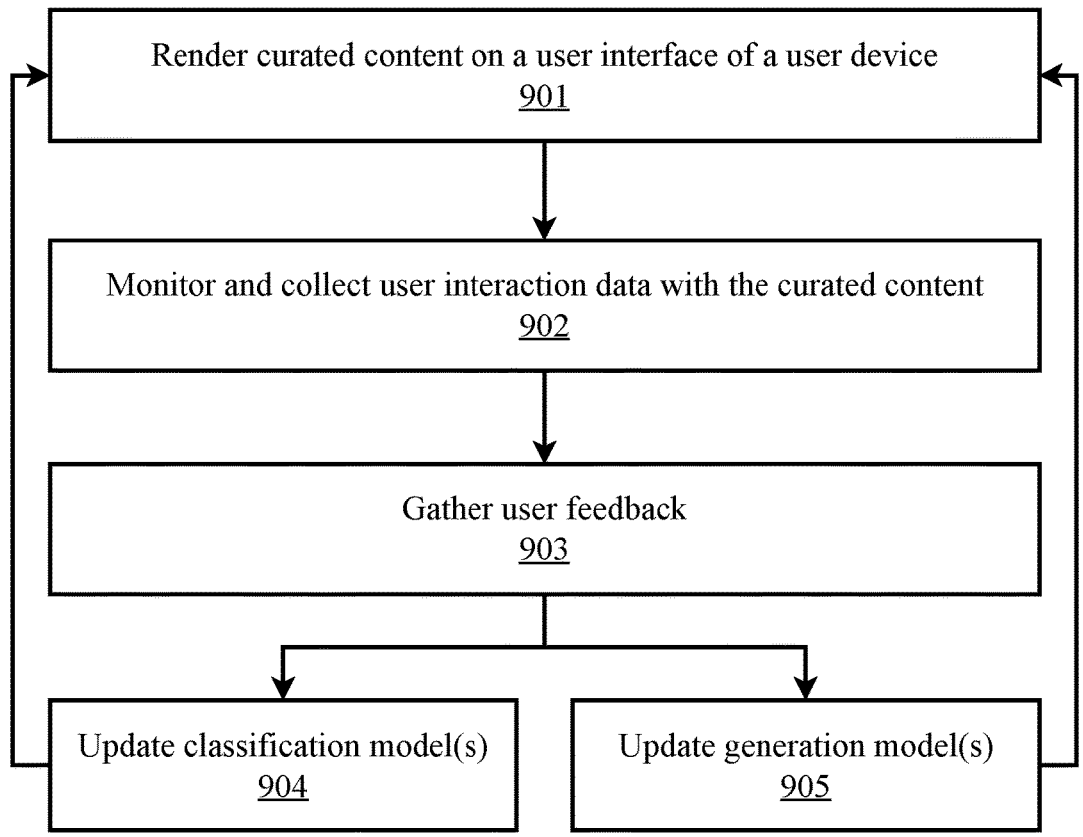
FIG. 9 is a flow diagram illustrating an exemplary method for using user interaction with curated content to improve the classification and curation process, according to an embodiment.

FIG. 9 is a flow diagram illustrating an exemplary method 900 for using user interaction with curated content to improve the classification and curation process, according to an embodiment. This exemplary method may be performed by a dynamic experience curation platform and/or one or more of its component systems or subsystems such as, for example, process filtering system 132 and/or model management system 134. According to the embodiment, the process begins at step 901 when a dynamic experience curation platform renders curated content on a UI/UX of a user device responsive to a user submitted content request.

While the user interacts with the curated content the platform monitors and collects all user interaction data at step 902. User interaction data captured as a user interacts with curated content on their user device can vary depending on the type of device. If the user device is a personal computer or laptop then interaction data can include, but is not limited to, mouse movements and clicks (e.g., capturing the position of the mouse cursor, mouse clicks, and mouse movement patterns), keyboard inputs (e.g., recording keystrokes and text inputs), scroll and zoom actions, window and tab interactions (e.g., monitoring the opening, closing, and switching of windows and tabs), and system events (e.g., capturing system events such as window resize, focus changes, and screen orientation). If the user device is a mobile device such as a smart phone or tablet or smart wearable, then interaction data can include, but is not limited to, touch gestures (e.g., recording tap, swipe, pinch, and rotate gestures on the touchscreen), sensor data (e.g., accelerometer and gyroscope data), GPS and location data, Application interactions (e.g., monitoring the opening, closing, and switching of applications), and camera and microphone data. If the user device is a VR/AR device, then interaction data can include, but is not limited to, head movements/orientation, controller interactions (e.g., button presses and gestures), environment scanning (e.g., recording data from sensors used to scan and map the user's physical environment in AR), eye tracking, and voice commands. Collected user interaction data may be persisted in a database. In some embodiments, user interaction data may be stored in a user profile in a database (e.g., preference database). This stored user interaction data, or subset thereof, may be used as training data to train/update various models utilized by platform 130.

At step 903, the platform gathers user feedback. User feedback may be gathered in various ways. For example, user feedback about curated content/experience may be gathered using a combination of survey/questionnaires, interactive elements, and other methods. In some implementations, platform can embed a survey or questionnaire with the user interface of the user device and prompt the user to complete the survey after they have interacted with the curated content or after a certain period of time. The survey/questionnaire could use a mix of multiple-choice questions, rating scales, and open-ended questions to gather feedback on the relevance, quality, and satisfaction with the curated content. In some implementations, platform can add interactive elements such as, for example, like/dislike buttons, star ratings, or thumbs up/down icons directly alongside curated content to encourage users to provide feedback by interacting with these elements to indicate their preferences or satisfaction with the content. Other methods can include the use of user comments (i.e., allow suer to leave comments or feedback directly on the curated content), A/B testing (e.g., compare different versions, either from the same model or multiple models, to gather feedback), and/or contextual feedback wherein feedback prompts are triggered based on specific user actions or interactions with the curated content, such as after a user completes a task or spends a certain amount of time on a page. The use context-aware feedback mechanisms allow the platform to gather feedback at relevant moments, such as when a user is actively engaging with the content. User feedback data may be stored in a database. In some implementations, the user feedback may be stored in a user profile in a database (e.g., preference database). In some implementations, user feedback and user interaction data may be vectorized using an embedding model and stored in a vector database.

The collected user interaction data and the gathered user feedback may be used to train/update one or more classification models at step 904 and one or more generation models at step 905. For example, generation models can include one or more variational autoencoders and/or one or more generative adversarial networks and/or one or more large language models. This information may be used to update the model parameters and improve the quality of the generated content. For example, a model's weights may be adjusted based on user ratings or preferences to prioritize certain types of content. The updated classification/generation models may be deployed to generate curated content based on the latest user feedback and interaction data wherein the process repeats thus forming a learning loop to continuously improve the models based on user feedback and new data to enhance the quality of the curated content.

Figure 10:
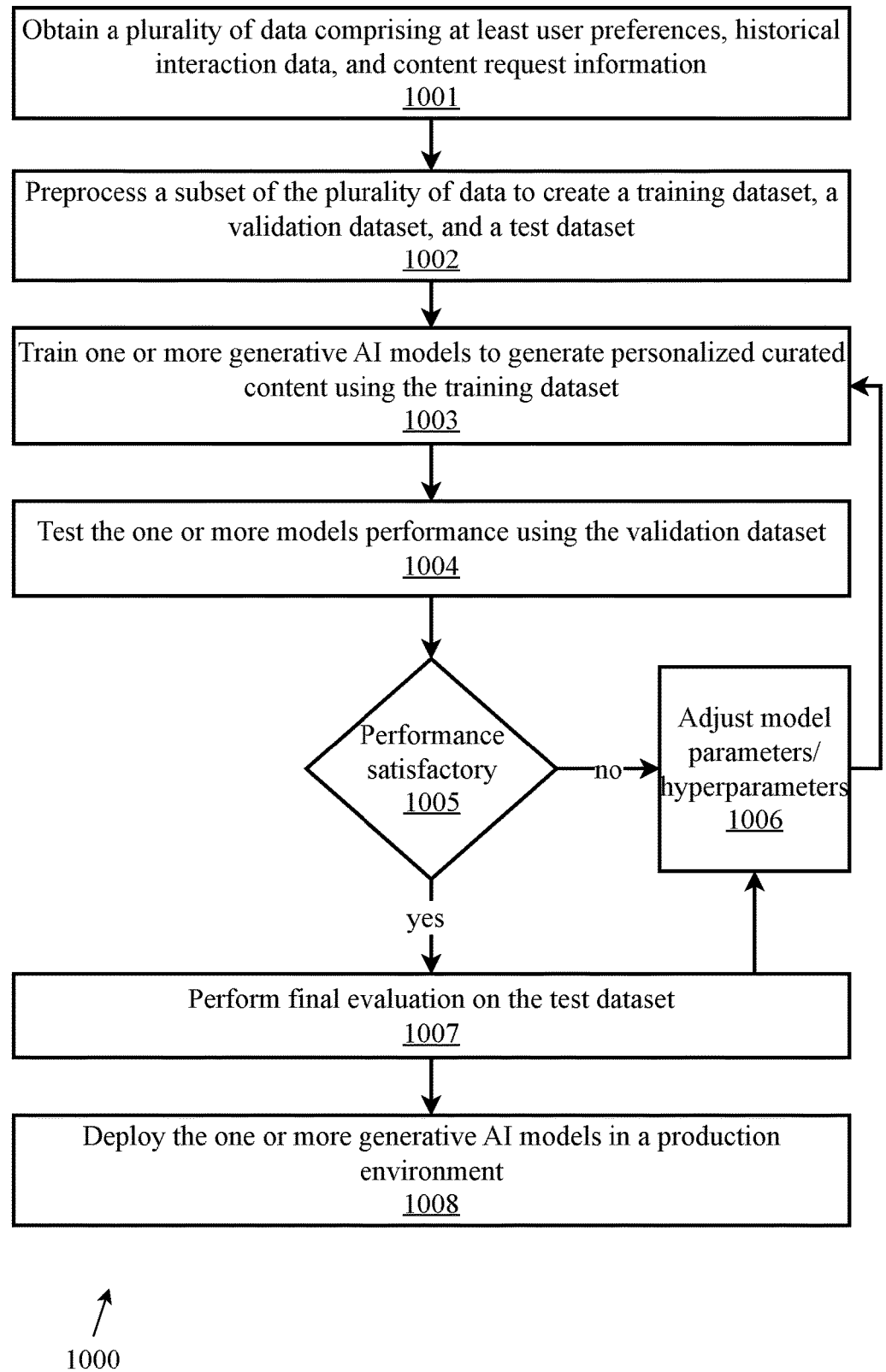
FIG. 10 is a flow diagram illustrating an exemplary method for training a generative model to generate curated content, according to an embodiment.

FIG. 10 is a flow diagram illustrating an exemplary method 1000 for training a generative model to generate curated content, according to an embodiment. This exemplary method may be performed by a dynamic experience curation platform and/or one or more of its component systems or subsystems such as, for example, process filtering system 132 and/or model management system 134. According to the embodiment, the process begins at step 1001 when platform 130 obtains a plurality of data comprising at least a plurality of user preferences, historical user interaction data, and content request information. The user preferences may be obtained from preference database 136. At step 1002, platform preprocesses (e.g., data cleansing, data normalization, feature extraction/engineering, etc.) a subset of the plurality of obtained data to create a training dataset, a validation dataset, and a test dataset. Model management system 134 may use the training dataset to train one or more generative AI models to generate personalized curated content at step 1003. Examples of generative AI models that may be trained can include, but are not limited to, large language models, autoencoders and variants thereof (e.g., variational), generative adversarial networks, transformer models (e.g., generative pre-trained transformer), convolutional neural networks, StyleGAN, Pix2Pix, DeepDream, and/or the like.

The one or more generative AI models may be trained to curate content for a user such as images, text, music, and more. During the training step, the algorithm(s) is trained on the training dataset. After each training epoch (a full pass through the training dataset), the algorithm's performance is evaluated using the validation dataset at step 1004. The evaluation helps determine if the model is overfitting (performing well on the training data but not generalizing well to new data) or underfitting (not learning the patterns in the data). A check is made at 1005 of the model performance. For example, metrics such as content relevance, user engagement, and user satisfaction are possible performance metrics that may be used to evaluate model performance. If the model is not performing to some standard or threshold value, then the process proceeds to step 1006 wherein the model parameters and/or hyperparameters may be tuned or adjusted prior to the next iteration of model training. For example, the model's weights may be adjusted based on user ratings or preferences to prioritize certain types of content or to account for specific legal constraints. After model adjustments have been made, the process move back to step 1003 wherein the training loop is iterated through again.

If instead, when the check 1005 is made and the model performs well on the validation dataset, then a final evaluation may be performed using the test dataset at step 1007. The test dataset provides the final model a dataset the model has not seen before. This provides an unbiased estimate of the model's performance on new, unseen data. If the model does not satisfy some performance criteria, then the process may proceed to step 1006 and execute the steps described above. If the final model does satisfy the performance criteria, then at step 1008 the one or more generative AI models may be deployed in a production environment as a personalized (i.e., preference) filter to dynamically curate user requested content.

Figure 11:
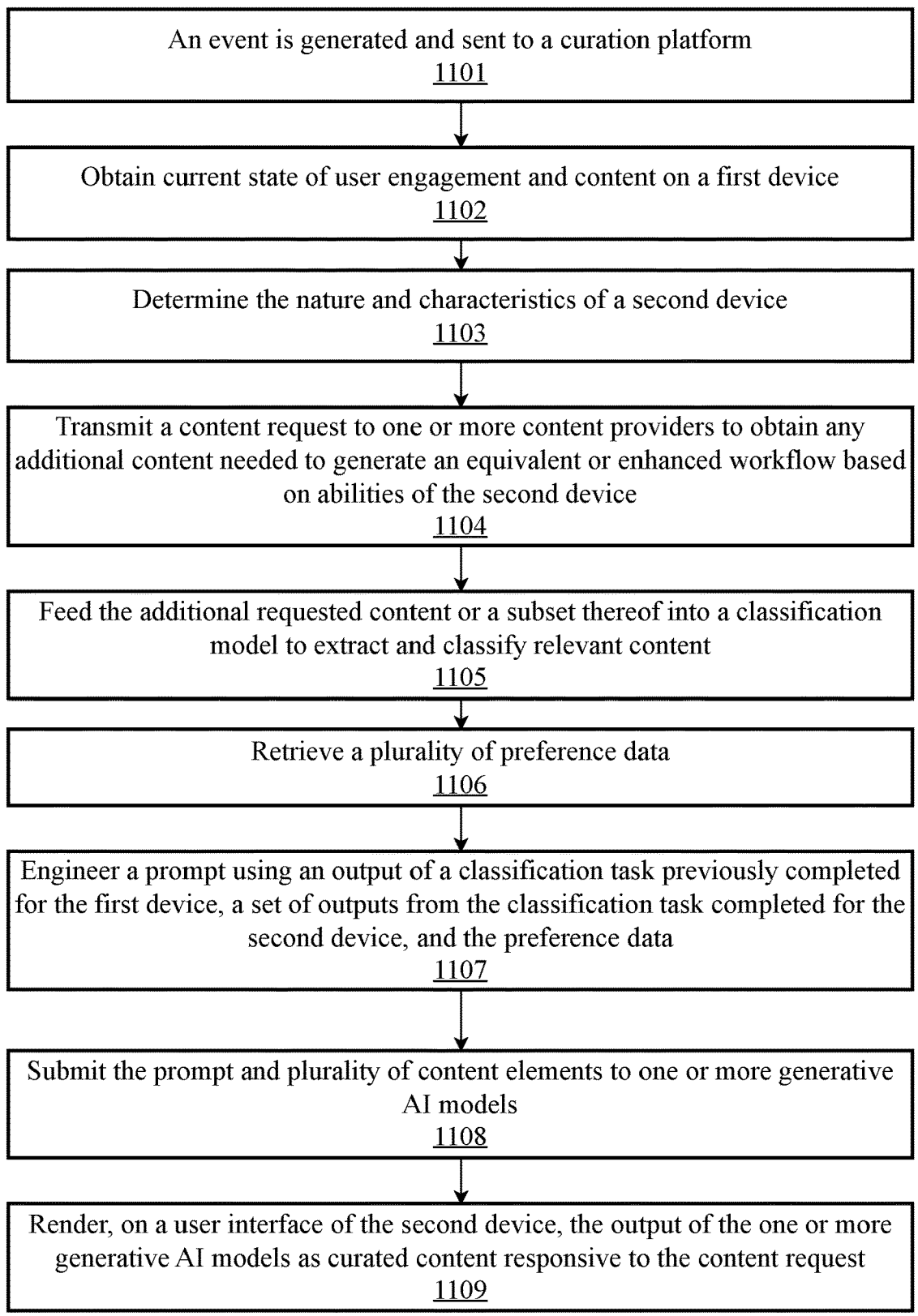
FIG. 11 is a flow diagram illustrating an exemplary method for transitioning user engagement and content across different devices, according to an embodiment.

FIG. 11 is a flow diagram illustrating an exemplary method for transitioning user engagement and content across different devices, according to an embodiment. According to the embodiment, the process begins at step 1101 when an event is generated and sent to experience curation platform 130. At step 1102 platform obtains the current state of user engagement and content on a first device (e.g., a desktop computer). Platform may then determine the nature and characteristics of a second device (e.g., a VR device, smart wearable device, etc.) at step 1103.

The experience curation platform can determine the nature and characteristics of the second device through various methods including, but not limited to, device identification, API calls, user agent string, device profiling, user input, machine learning, and benchmark tests. When the user switches to a new device, the device may send identifying information to the platform, such as the device model, operating system, and version. This information can be used to look up the device's capabilities in a database. The platform can make API calls to the device's software development kit (SDK) or operating system to retrieve information about the device's hardware and software capabilities, such as screen resolution, processing power, available sensors, and supported APIs. In web-based scenarios, the device's user agent string can provide information about the device type, operating system, and browser, which can help infer its capabilities. The platform may maintain a database of device profiles that contain information about the capabilities and characteristics of various devices. When a user switches to a new device, the platform can look up the device's profile to determine its nature and characteristics. The platform may prompt the user to provide information about their device or to select their device from a list of options. The platform can employ machine learning models to analyze device data, such as screen size, resolution, and user interaction patterns, to infer the device's characteristics and capabilities. The platform may run brief benchmark tests on the device to assess its performance, graphics capabilities, and other characteristics. By combining these methods, experience curation platform 130 can gather a comprehensive understanding of the second device's nature and characteristics, enabling it to adapt the content and user experience accordingly.

At step 1104, platform transmits a content request to one or more content providers to obtain any additional content needed to generate an equivalent or enhanced workflow based on the abilities (nature and characteristics) of the second device. At step 1105, platform feeds the additional requested content or a subset thereof into a classification model to extract and classify relevant content. Platform may also retrieve a plurality of user preference data at 1106. At 1107 the platform engineers a prompt using an output of a classification task previously completed for the first device, a set of outputs from the classification step of 1105 completed for the second device, and the preference data. At step 1108, platform submits the prompt and plurality of content elements to one or more generative AI models. As a last step 1109, platform renders, on a user interface of the second device, the output of the one or more generative AI models as curated content responsive to the content request. In some implementations, ongoing user engagement with a device like can be reinterpreted and broadcast for other mediums and devices, such as televisions or monitors.

Exemplary Computing Environment

Figure 12:
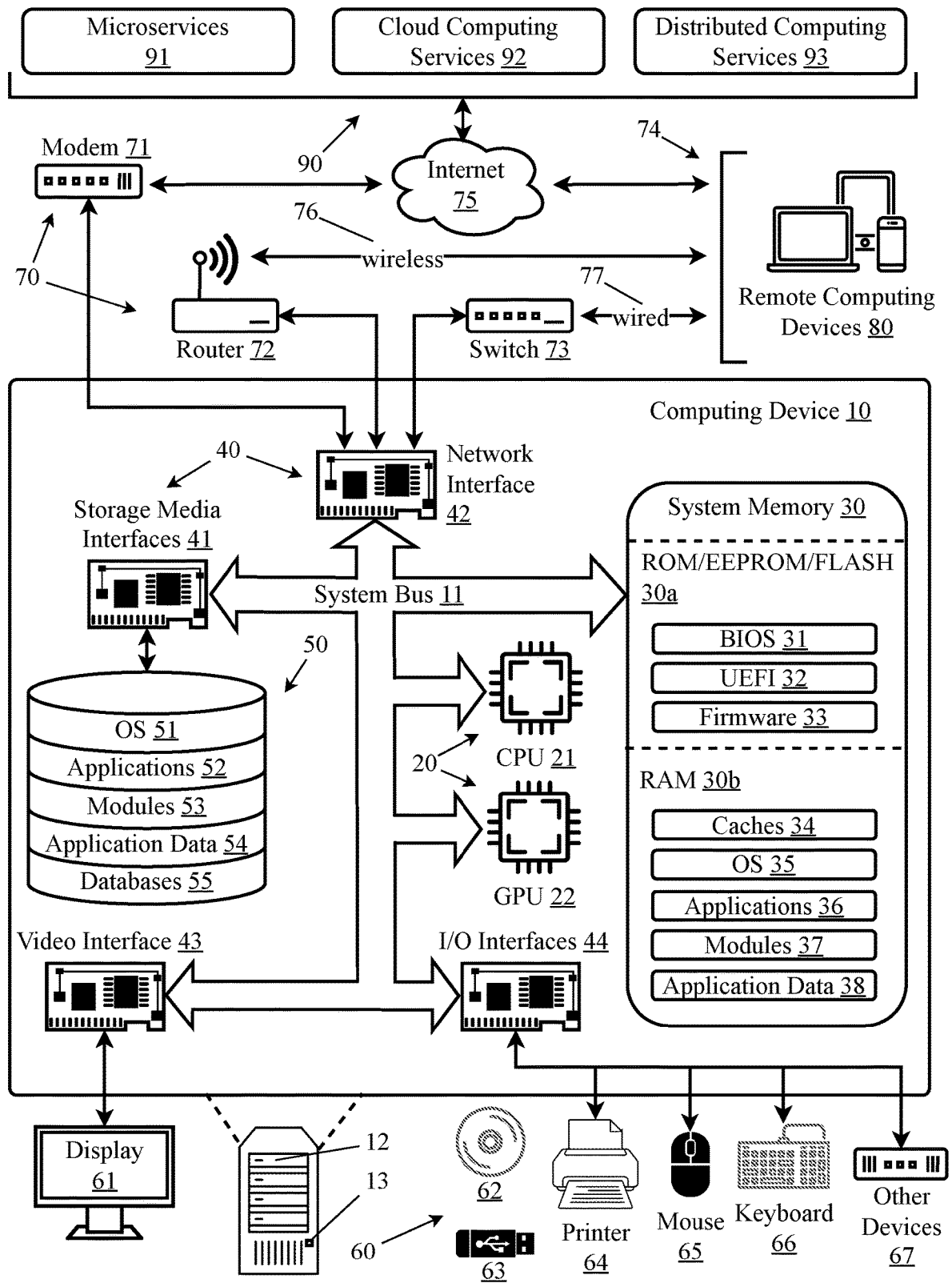
FIG. 12 illustrates an exemplary computing environment on which an embodiment described herein may be implemented.

FIG. 12 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, BOSQL databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computing system for dynamic experience curation using one or more virtual cross-platform agents employing a dynamic experience curation platform, the computing system comprising:
   one or more hardware processors configured for:
   transmitting a content request to one or more content providers;
   receiving the requested content from the one or more content providers;
   feeding the requested content or a subset thereof into a classification model to extract and classify relevant content;
   retrieving a plurality of user preference data;
   verifying an applicable preference hierarchy from a plurality of stored preference sets to determine a contextually relevant preference set active for the current content request based on current context, wherein current context comprises a sliding time window that includes an amount of historical, current, and projected context based on a finite time horizon;
engineering at least one prompt or input using an output of the classification task and the plurality of resultant user preference data;
submitting the prompt and the requested content to one or more generative artificial intelligence (AI) models;
receiving output from the one or more generative AI models; and
rendering, on a user interface of a user device, the received output as curated content responsive to the content request.

2. The computing system of claim 1, wherein the user device is a first user device and the content request is received from the first user device.

3. The computing system of claim 2, wherein the output of the one or more generative AI models is rendered on a second user device.

4. The computing system of claim 1, wherein the one or more generative AI models include a Retrieval Augmentation Generation component.

5. The computing system of claim 1, wherein the rendered output is rendered directly or indirectly via one or more existing applications.

6. The computing system of claim 1, wherein the prompt comprises text, a neural network interface to an AI system, a binary object, or a machine understandable image or video format.

7. The computing system of claim 1, wherein the curated content comprises accessibility overlays.

8. The computing system of claim 7, wherein the accessibility overlays comprise text-to-speech conversion, a screen reader, alternative control/input methods, magnification and zoom, color contrast adjustment, captions and transcripts, sign language interpretation, keyboard navigation, voice control, simplified content layout, readability enhancements, visual cues and notifications, haptic feedback, and easy language and symbol support.

9. The computing system of claim 1, wherein the one or more virtual cross-platform agents implement application-to-application communication protocols for coordinating with external systems.

10. The computing system of claim 1, wherein the dynamic experience curation platform provides a natural language interface for web resource interaction.

11. The computing system of claim 1, wherein the system implements model context protocols for managing communication between the generative AI models and external data sources.

12. A computer-implemented method executed on a dynamic experience curation platform for dynamic experience curation using one or more virtual cross-platform agents, the computer-implemented method comprising:
transmitting a content request to one or more content providers;
receiving the requested content from the one or more content providers;
feeding the requested content or a subset thereof into a classification model to extract and classify relevant content;
retrieving a plurality of user preference data;
engineering a prompt using an output of the classification task and the plurality of user preference data;
verifying an applicable preference hierarchy from a plurality of stored preference sets to determine a contextually relevant preference set active for the current content request based on current context, wherein current context comprises a sliding time window that includes an amount of historical, current, and projected context based on a finite time horizon;
submitting the prompt and the requested content to one or more generative artificial intelligence (AI) models;
receiving output from the one or more generative AI models; and
rendering, on a user interface of a user device, the received output as curated content responsive to the content request.

13. The computer-implemented method of claim 12, wherein the user device is a first user device and the content request is received from the first user device.

14. The computer-implemented method of claim 13, wherein the output of the one or more generative AI models is rendered on a second user device.

15. The computer-implemented method of claim 12, wherein the one or more generative AI models include a Retrieval Augmentation Generation component.

16. The computer-implemented method of claim 12, wherein the rendered output is rendered directly or indirectly via one or more existing applications.

17. The computer-implemented method of claim 12, wherein the prompt comprises text, a neural network interface to an AI system, a binary object, or a machine understandable image or video format.

18. The computer-implemented method of claim 12, wherein the curated content comprises accessibility overlays.

19. The computer-implemented method of claim 18, wherein the accessibility overlays comprise text-to-speech conversion, a screen reader, alternative control/input methods, magnification and zoom, color contrast adjustment, captions and transcripts, sign language interpretation, keyboard navigation, voice control, simplified content layout, readability enhancements, visual cues and notifications, haptic feedback, and easy language and symbol support.

20. A system for dynamic experience curation using one or more virtual cross-platform agents employing a dynamic experience curation platform, comprising one or more computers with executable instructions that, when executed, cause the system to:
transmit a content request to one or more content providers;
receive the requested content from the one or more content providers;
feed the requested content or a subset thereof into a classification model to extract and classify relevant content;
retrieve a plurality of user preference data;
engineer a prompt using an output of the classification task and the plurality of user preference data;
verify an applicable preference hierarchy from a plurality of stored preference sets to determine a contextually relevant preference set active for the current content request based on current context, wherein current context comprises a sliding time window that includes an amount of historical, current, and projected context based on a finite time horizon;
submit the prompt and the requested content to one or more generative artificial intelligence (AI) models;
receive output from the one or more generative AI models; and render, on a user interface of a user device, the received output as curated content responsive to the content request.

21. The system of claim 20, wherein the user device is a first user device and the content request is received from the first user device.

22. The system of claim 21, wherein the output of the one or more generative AI models is rendered on a second user device.

23. The system of claim 20, wherein the one or more generative AI models include a Retrieval Augmentation Generation component.

24. The system of claim 20, wherein the rendered output is rendered directly or indirectly via one or more existing applications.

25. The system of claim 20, wherein the prompt comprises text, a neural network interface to an AI system, a binary object, or a machine understandable image or video format.

26. The system of claim 20, wherein the curated content comprises accessibility overlays.

27. The system of claim 26, wherein the accessibility overlays comprise text-to-speech conversion, a screen reader, alternative control/input methods, magnification and zoom, color contrast adjustment, captions and transcripts, sign language interpretation, keyboard navigation, voice control, simplified content layout, readability enhancements, visual cues and notifications, haptic feedback, and easy language and symbol support.

28. Non-transitory, computer-readable storage media having computer executable instructions embodied thereon that, when executed by one or more processors of a computing system employing a dynamic experience curation platform for dynamic experience curation using one or more virtual cross-platform agents, cause the computing system to:
    transmit a content request to one or more content providers;
    receive the requested content from the one or more content providers;
    feed the requested content or a subset thereof into a classification model to extract and classify relevant content;
    retrieve a plurality of user preference data;
    engineer a prompt using an output of the classification task and the plurality of user preference data;
    verify an applicable preference hierarchy from a plurality of stored preference sets to determine a contextually relevant preference set active for the current content request based on current context, wherein current context comprises a sliding time window that includes an amount of historical, current, and projected context based on a finite time horizon;
    submit the prompt and a plurality of content elements to one or more generative artificial intelligence (AI) models;
    receive output from the one or more generative AI models; and
    render, on a user interface of a user device, the received output as curated content responsive to the content request.

29. The non-transitory, computer-readable storage media of claim 28, wherein the user device is a first user device and the content request is received from the first user device.

30. The non-transitory, computer-readable storage media of claim 29, wherein the output of the one or more generative AI models is rendered on a second user device.

31. The non-transitory, computer-readable storage media of claim 28, wherein the one or more generative AI models include a Retrieval Augmentation Generation component.

32. The non-transitory, computer-readable storage media of claim 28, wherein the rendered output is rendered directly or indirectly via one or more existing applications.

33. The non-transitory, computer-readable storage media of claim 28, wherein the prompt comprises text, a neural network interface to an AI system, a binary object, or a machine understandable image or video format.

* * * * *